United States Patent
Doi et al.

(10) Patent No.: US 7,248,898 B2
(45) Date of Patent: Jul. 24, 2007

(54) RADIO DEVICE, TRANSMISSION/RECEPTION DIRECTIVITY CONTROL METHOD, AND TRANSMISSION/RECEPTION DIRECTIVITY CONTROL PROGRAM

(75) Inventors: Yoshiharu Doi, Gifu (JP); Akira Ishida, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/508,557

(22) PCT Filed: Mar. 11, 2003

(86) PCT No.: PCT/JP03/02884

§ 371 (c)(1),
(2), (4) Date: Jun. 17, 2005

(87) PCT Pub. No.: WO03/081808

PCT Pub. Date: Oct. 2, 2003

(65) Prior Publication Data

US 2006/0014497 A1 Jan. 19, 2006

(30) Foreign Application Priority Data

Mar. 22, 2002 (JP) .............................. 2002-081458

(51) Int. Cl.
*H04B 1/38* (2006.01)
*H04M 1/00* (2006.01)

(52) U.S. Cl. .................... 455/562.1; 455/69; 455/63.4; 455/561; 342/377; 342/374; 342/368

(58) Field of Classification Search ............ 455/562.1, 455/69, 63.4, 561, 67.16, 456.1; 342/377, 342/374, 368, 373
See application file for complete search history.

(56) References Cited

U.S. PATENT DOCUMENTS 6,446,025 B1 * 9/2002 Nakamura et al. .......... 702/159
6,624,784 B1 * 9/2003 Yamaguchi ................. 342/378
7,003,324 B2 * 2/2006 Hiramatsu ............... 455/562.1

(Continued)

FOREIGN PATENT DOCUMENTS

CN 1304586 A 7/2001

(Continued)

OTHER PUBLICATIONS

Personal Handy Phone System ARIB Standard RCR STD-28, *Association of Radio Industries and Businesses*, May 2004.

(Continued)

*Primary Examiner*—Matthew Anderson
*Assistant Examiner*—Tuan Pham
(74) *Attorney, Agent, or Firm*—McDermott Will & Emery LLP

(57) ABSTRACT

A radio device includes an array antenna including a plurality of antennas; an adaptive array processing unit multiplying signals provided from the respective antennas of the array antenna by receive weights, and thereby extracting a signal received from desired another radio device; a switch circuit provided corresponding to at least one of the plurality of antennas for providing the signal received from the corresponding antenna to the reception signal processing unit in a receive operation; and a transmission amplifier amplifying and providing a modulated transmission signal to the first switch circuit corresponding to the one of the plurality of antennas.

8 Claims, 22 Drawing Sheets

U.S. PATENT DOCUMENTS

| | | | |
|---|---|---|---|
| 7,039,363 B1 * | 5/2006 | Kasapi et al. | 455/67.11 |
| 7,043,275 B2 * | 5/2006 | Matsuoka et al. | 455/562.1 |
| 2001/0049295 A1 | 12/2001 | Matsuoka et al. | |
| 2002/0077153 A1 | 6/2002 | Chiba et al. | |
| 2003/0068993 A1 * | 4/2003 | Miya | 455/276.1 |
| 2004/0127260 A1 * | 7/2004 | Boros et al. | 455/562.1 |

FOREIGN PATENT DOCUMENTS

| | | |
|---|---|---|
| EP | 1041839 A2 * | 10/2000 |
| JP | 11-252614 | 9/1999 |
| JP | 2000-216724 | 8/2000 |
| JP | 2001-251233 | 9/2001 |
| WO | WO 99/52226 | 10/1999 |

OTHER PUBLICATIONS

Nobuyoshi Kikuma, "Adaptive Signal Processing by Array Antenna", *Kagaku Gijutsu Shuppan* pp. 35-49, Nov. 1998.

* cited by examiner

RADIO DEVICE, TRANSMISSION/RECEPTION DIRECTIVITY CONTROL METHOD, AND TRANSMISSION/RECEPTION DIRECTIVITY CONTROL PROGRAM

TECHNICAL FIELD

The present invention relates to a radio device, and particularly to a radio device, a transmission and reception directivity control method and a transmission and reception directivity control program, which can transmit and receive signals with directivity by performing adaptive array processing.

DESCRIPTION OF THE BACKGROUND ART

In recent years, mobile communication systems such as a PHS (Personal Handy phone System) have been rapidly developed, and these systems have employed a TDMA method, in which one frame (5 milliseconds) formed of four slots (625 microseconds per slot) is used as a basic unit for transmission and reception. This TDMA method of the PHS has been standardized, e.g., as a "second generation cordless communication system").

In the communication system of the PHS, a signal in one frame is divided into eight slots, which are divided into a first half including four slots for reception as well as a latter half including four slots for transmission.

Each slot is formed of 120 symbols. For example, the signal in one frame is handled such that three slot sets each formed of one reception slot and one transmission slot are allocated to traffic channels for three users, respectively, and remaining one set of slots is allocated to a control channel.

According to controlling procedures for establishing synchronization in the PHS, a link channel is first established by a control channel, and processing of measuring interference wave (U-waves: Undesired waves) is performed. Further processing is performed to set communication conditions with allocated channels, and thereafter, the speech communication starts. The above procedures are disclosed in detail by standards of the PHS, and particularly by the second generation cordless communication system standards RCR STD-28 issued by Association of Radio Industries and Businesses.

FIG. 21 illustrates a communication sequence flow of the PHS. Referring to FIG. 21, this flow will now be briefly described.

By using a C-channel (Control channel: CCH), a link channel establishment request signal (LCH establishment request signal) is sent from a PHS terminal to a base station. The PHS base station detects an empty channel (i.e., empty traffic channel (empty T-channel)), and sends a link channel allocation signal (LCH allocation signal) to the PHS terminal side via the C-channel.

On the PHS terminal side, it is determined based on link channel information received from the PHS base station whether interference wave signals of a predetermined power or higher are received or not on a designated T-channel, and thus U-wave measurement and carrier sense are performed. When interference wave signals of the predetermined power or higher are not detected, i.e., when another PHS base station is not using the designated T-channel, a synchronous burst signal is sent to the base station by the designated T-channel, and a synchronous burst signal is also returned from the base station to the terminal to establish the synchronization.

When interference wave signals of the predetermined power or higher are detected on the designated T-channel, i.e., when another PHS base station is using the designated T-channel, the PHS terminal repeats the control procedures starting from issuance of the request signal for the link channel establishment.

As described above, the PHS connects the communication channel between the terminal and the base station by using the channel, which can provide good communication characteristics suppressing the interference waves.

For maintaining a good communication quality by suppressing an influence by communication of another base station, the PHS may perform transmission and reception with directivity when the base station transmits a signal to the terminal or receives a signal therefrom.

In the PHS and others, a PDMA (Path Division Multiple Access) system is available for increasing an efficiency of use of wave frequencies. In the PDMA, spatial multiple connection can be achieved between mobile radio terminal devices (terminals) of a plurality of users and the radio base station (base station) via a plurality of paths, which are formed by spatially dividing the same time slot of the same frequency.

For example, an adaptive array technology has been employed for achieving the directivity in the transmission and reception and achieving the PDMA system described above. The adaptive array processing can accurately extracts signals from a desired terminal by adaptive control, which is performed by calculating a weight vector (receive weight vector) formed of receive coefficients (weights) for respective antennas of the base station based on the signal received from the terminal, and thus, by multiplying the reception signals of the plurality of antennas by respective elements of the receive weight vector.

By the adaptive array processing, an uplink signal sent from the antenna of each user terminal is received by the array antenna of the base station, and the signal thus received is separated and extracted with a receive directivity.

The transmission signals (i.e., signals to be sent) are processed such that signals, which are produced by multiplying the transmission signal by respective elements of the transmission weight vector calculated from the receive weight vector, are transmitted from the plurality of antennas, and thereby a downlink signal to be sent from the base station to the terminal is transmitted with a send directivity with respect to the antenna of the terminal.

The above adaptive array processing is well known, and is specifically disclosed in Nobuyoshi Kikuma "Chapter 3: MMSE Adaptive Array" in "Adaptive Signal Processing by Array Antenna", Kagaku Gijutsu Shuppan, Nov. 25, 1998, pp. 35–49. Therefore, an operation principle thereof is not described in this specification.

Among the signals received in the PDMA system, a desired signal is identified in the following manner. A radio signal transmitted between a terminal such as a cellular phone and a base station is divided into a plurality of frames, and thus has a so-called frame structure when it is transmitted. Each frame includes eight slots formed of, e.g., four slots for uplink communication and four slots for downlink communication. This slot signal is basically formed of a preamble formed of a signal series, which is known on a receiver side, and data (such as voice) formed of a signal series, which is unknown on the receiver side.

The preamble signal series includes a signal series (reference signal such as a unique word signal) of information for determining whether the sender on the other end is the desired party for the receiver side or not. For example, the adaptive array radio base station performs weight vector control (determination of weight coefficients) to extract a signal, which is presumed to include a signal series corresponding to the desired party on the other end, based on a comparison between the unique word signal obtained from the memory and the received signal series.

Further, each frame includes the foregoing unique word signal (reference signal) section, and is further configured to allow error detection with cyclic codes (CRC: Cyclic Redundancy Check).

FIG. 22 is a conceptual view illustrating a state of communication between a conventional radio device and a base station.

In an example illustrated in FIG. 22, the communication is being performed between a radio base station CS1 and a radio terminal device PS1, and the communication is also being performed between another radio base station CS2 neighboring to radio base station CS1 and another radio terminal device PS2.

In FIG. 22, it is assumed that non-directional transmission and reception is performed for both the communication from the radio terminal device to the base station, which will be referred to as "uplink communication" hereinafter, and the communication from the radio base station to the radio terminal device, which will be referred to as "downlink communication" hereinafter.

In the structure illustrated in FIG. 22, a problem of interference is liable to occur when the communication in a peripheral cell, which is a communication region of radio base station CS2, is being performed with the same frequency and at the same time as the communication in a cell, which is a communication region of radio base station CS1.

More specifically, in the uplink communication, the quality of the uplink communication in the station's own cell is impaired by the interference from the peripheral cell.

Likewise, in the downlink communication, the interference is applied to the peripheral cell to impair the downlink quality of the terminal, which is communicating in the peripheral cell.

In FIG. 22, arrows with dotted lines indicate interference signals occurring between radio base station CS1 and radio terminal device PS2.

For suppressing the interference during the simultaneous communication with the same frequency, the adaptive array transmission and reception already described may be performed.

However, if the adaptive array transmission and reception is performed in both the uplink communication and the downlink communication, this increases an installation cost of the base station.

More specifically, for performing the adaptive array processing in the downlink communication, an expensive high-power amplifier is required for every antenna of the base station, resulting in the high installation cost.

Further, each base station requires a signal processing circuit for controlling the downlink directivity, which further increases the cost.

If the FDD (Frequency Division Duplex) system is employed, it is difficult to control accurately the directivity.

In other words, a difference occurs in amount of rotation of a phase, which is caused when passing through a propagation path, between the uplink communication and the downlink communication. Therefore, it is difficult to control the directivity in the downlink communication based on information related to the directivity obtained in the uplink communication so that accurate control of the directivity is difficult, and interference with the peripheral cell increases.

The invention has been developed for overcoming the above problems, and it is an object of the invention to provide a radio device, a transmission and reception directivity control method and a transmission and reception directivity control program, which can reduce an installation cost of the base station, and can suppress interference signals affecting a peripheral cell.

DISCLOSURE OF THE INVENTION

In summary, the invention includes an array antenna including a plurality of antennas; a reception signal processing unit multiplying signals provided from the respective antennas of the array antenna by reception weights, and thereby extracting a signal received from desired another radio device; switch means provided corresponding to at least one of the plurality of antennas for providing the signal received from the corresponding antenna to the reception signal processing unit in a reception operation; and a transmission signal processing unit modulating and providing a transmission signal to the first switch means corresponding to the one antenna of the plurality of antennas. The first switch means provides the signal received from the transmission signal processing unit to the corresponding antenna in a transmission operation.

Preferably, the first switch means are provided corresponding to the plurality of antennas, respectively, and the radio device further includes reception level measuring means for measuring reception levels of the signals transmitted from a terminal to be communicated with the radio device and received by the plurality of antennas, respectively; storage means for storing results of the measurements of the reception level measuring means; antenna selecting means for selecting the antenna having the maximum reception level from the plurality of antennas based on information stored in the storage means; and second switch means for providing the signal provided from the transmission signal processing unit to the first switch means corresponding to the selected antenna in accordance with a result of selection by the antenna selecting means.

Preferably, the radio device further includes reception level measuring means for measuring the reception level of the signal received by the plurality of antennas from a desired terminal to be communicated with the radio device; storage means for storing a result of the measurement by the reception level measuring means and a transmission power level required in accordance with the reception level; and transmission power calculating means for controlling an output level of the transmission signal processing unit in accordance with the transmission power level determined based on the information stored in the storage means.

Preferably, the reception level measuring means further measures a level of interference with respect to communication with the desired terminal, the storage means stores the transmission power level required in accordance with the reception level and the interference level, and the interference level, and the transmission power calculating means determines the transmission power level in accordance with the interference level and the reception level.

Preferably, the first switch means are provided corresponding to the plurality of antennas, respectively, and the radio device further includes reception level measuring means for measuring levels of the signals sent from a terminal to be communicated with the radio device and received by the plurality of antennas; storage means for storing a result of the measurement of the reception level measuring means and a transmission power level required in accordance with the reception level; transmission power calculating means for controlling an output level of the transmission signal processing unit in accordance with the transmission power level determined based on the information stored in the storage means; antenna selecting means selecting the antenna having the maximum reception level from the plurality of antennas based on the information stored in the storage means; and second switch means providing the signal provided from the transmission signal processing unit to the first switch means corresponding to the selected antenna in accordance with a result of selection of the antenna selecting means.

Preferably, the reception level measuring means further measures a level of interference with respect to communication performed with the desired terminal, the storage means stores the transmission power level required in accordance with the reception level and the interference level, and the interference level, and the transmission power calculating means determines the transmission power level in accordance with the interference level and the reception level.

According to another aspect of the invention, a transmission and reception directivity control method of a radio device with an array antenna including a plurality of antennas, includes the steps of multiplying signals provided from the respective antennas of the array antenna by reception weights, and thereby performing separation and extraction of a signal received from desired another radio device; modulating a transmission signal; and providing the modulated transmission signal to one of the plurality of antennas.

Preferably, the method further includes the steps of measuring reception levels of signals sent from a desired terminal to be communicated with the radio device and received by the plurality of antennas; storing the measured reception levels; selecting the antenna having the maximum reception level from the plurality of antennas based on the stored reception levels; and providing the modulated transmission signal to the selected antenna.

Preferably, the method further includes the steps of measuring reception levels of signals sent from a desired terminal to be communicated with the radio device and received by the plurality of antennas; storing the reception levels and transmission power levels required according to the reception levels; determining the transmission power level based on the reception level and the transmission power level required according to the reception level; and controlling a level of output of the modulated transmission signal according to the determined transmission power level.

Preferably, the method further includes the step of measuring the level of interference with respect to the communication performed with the desired terminal. The step of storing includes the step of storing the transmission power level required according to the measured reception level and the interference level, and the interference level. The step of determining the transmission power level includes the step of determining the transmission power level according to the interference level and the reception level.

Preferably, the method further includes the steps of measuring levels of signals sent from a desired terminal to be communicated with the radio device and received by the plurality of antennas; storing the measured reception levels and transmission power levels required according to the reception levels; determining the transmission power level based on the stored reception level and the transmission power level required according to the reception level; controlling an output level of the transmission signal according to the determined transmission power level; selecting the antenna having the maximum reception level from the plurality of antennas based on the measured reception levels; and providing the transmission signal to the selected antenna.

Preferably, the method further includes the step of measuring the level of interference with respect to the communication performed with the desired terminal. The step of storing includes the step of storing the transmission power level required according to the reception level and the interference level, and the interference level. The step of determining the transmission power level includes the step of determining the transmission power level according to the interference level and the reception level.

According to still another aspect of the invention, a transmission and reception directivity control program of a radio device with an array antenna including a plurality of antennas causes a computer to execute the steps of multiplying signals provided from the respective antennas of the array antennas by reception weights, and thereby performing separation and extraction of a signal received from desired another radio device; modulating a transmission signal; and providing the modulated transmission signal to one of the plurality of antennas.

Preferably, the program further causes the computer to execute the steps of measuring reception levels of signals sent from a terminal to be communicated with the radio device and received by the plurality of antennas; storing the measured reception levels; selecting the antenna having the maximum reception level from the plurality of antennas based on the stored reception levels; and providing the modulated transmission signal to the selected antenna.

Preferably, the program further causes the computer to execute the steps of measuring reception levels of signals sent from a desired terminal to be communicated with the radio device and received by the plurality of antennas; storing the reception levels and transmission power levels required according to the reception levels; determining the transmission power level based on the reception level and the transmission power level required according to the reception level; and controlling a level of output of the modulated transmission signal according to the determined transmission power level.

Preferably, the program further causes the computer to execute the step of measuring the level of interference with respect to the communication performed with the desired terminal. The step of storing includes the step of storing the transmission power level required according to the measured reception level and the interference level, and the interference level. The step of determining the transmission power level includes the step of determining the transmission power level according to the interference level and the reception level.

Preferably, the program further causes the computer to execute the steps of measuring levels of signals sent from a desired terminal to be communicated with the radio device and received by the plurality of antennas; storing the measured reception levels and transmission power levels required according to the reception levels; determining the transmission power level based on the stored reception level and the transmission power level required according to the reception level; controlling an output level of the transmission signal according to the determined transmission power level; selecting the antenna having the maximum reception level from the plurality of antennas based on the measured reception levels; and providing the transmission signal to the selected antenna.

Preferably, the program further causes the computer to execute the step of measuring the level of interference with respect to the communication performed with the desired terminal. The step of storing includes the step of storing the transmission power level required according to the reception level and the interference level, and the interference level. The step of determining the transmission power level includes the step of determining the transmission power level according to the interference level and the reception level.

BEST MODES FOR CARRYING OUT THE INVENTION

Embodiments of the invention will now be described with reference to the drawings. In the following description, the same or corresponding portions bear the same reference numbers, and description thereof is not repeated.

FIRST EMBODIMENT

Figure 1:
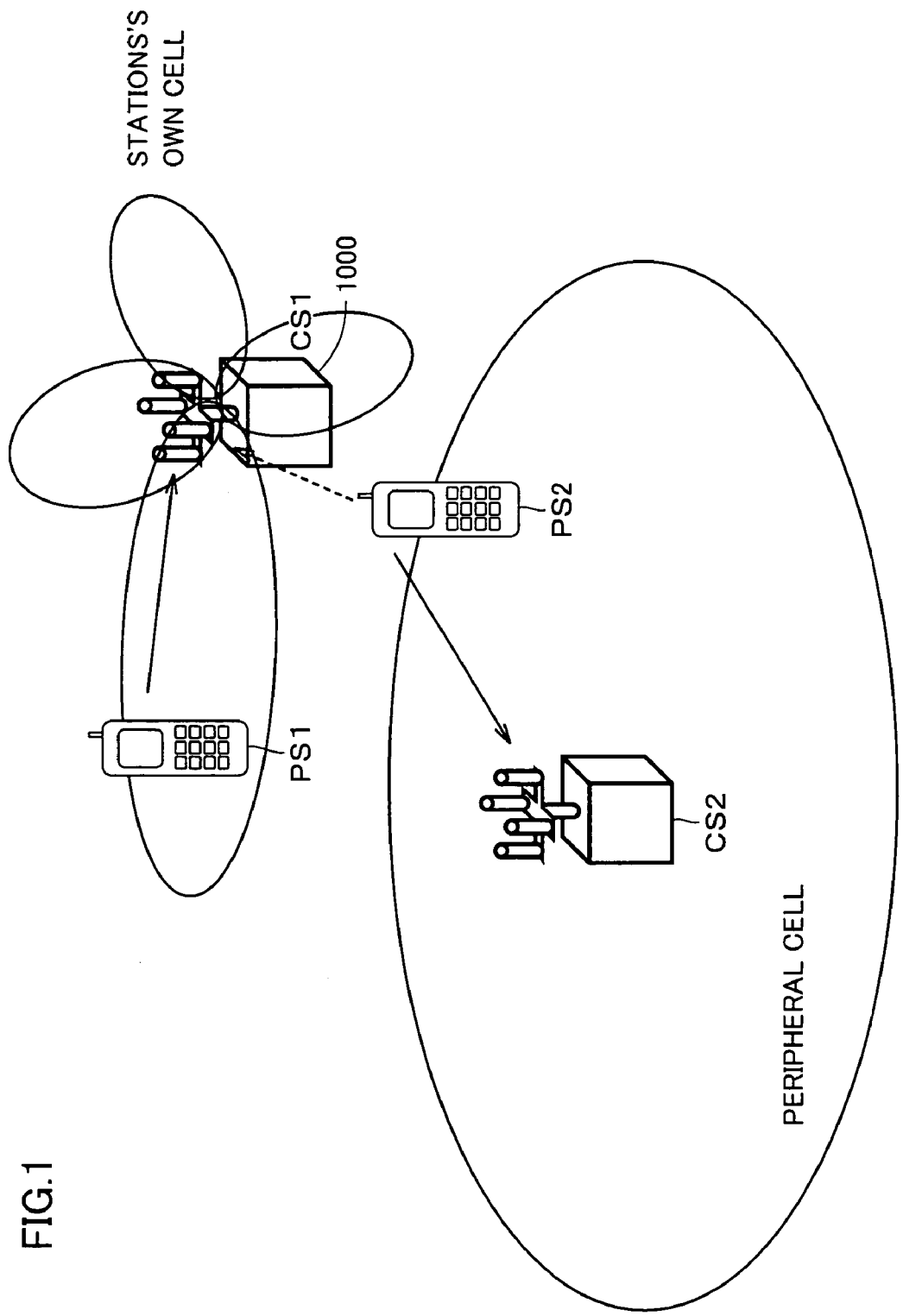
FIG. 1 is a conceptual view illustrating a directivity of uplink communication in a radio system according to a first embodiment of the invention.
Figure 2:
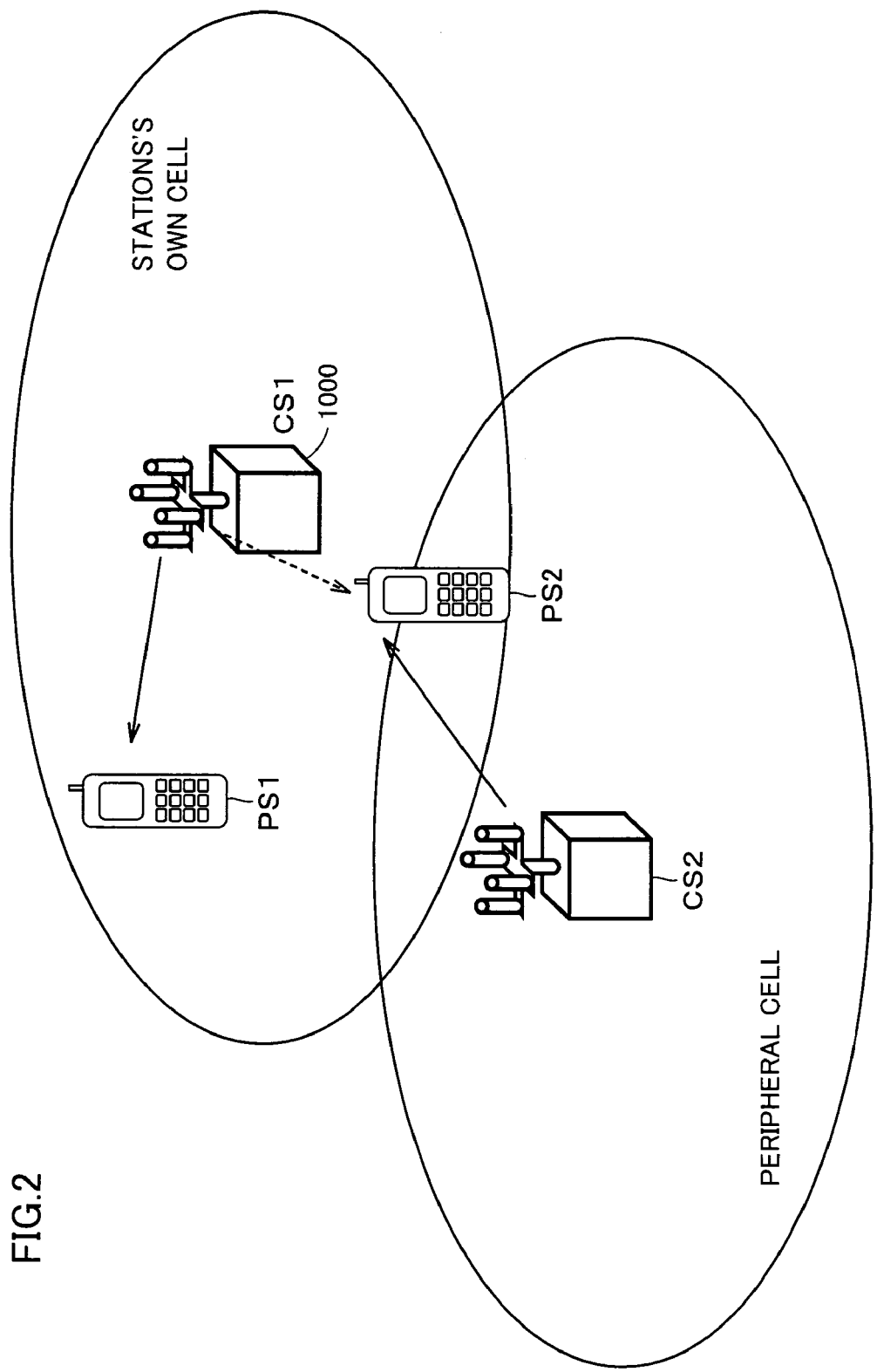
FIG. 2 illustrates directivity control in downlink communication according to the first embodiment of the invention.

FIG. 1 is a conceptual view for illustrating a directivity in uplink communication of a radio system according to a first embodiment of the invention. FIG. 2 illustrates directivity control in downlink communication according to the first embodiment of the invention.

The invention is not necessarily restricted to the PHS, but the PHS will now be described as an example of a radio system according to the invention.

Referring first to FIG. 1, a radio base station 1000 of the first embodiment performs adaptive array processing for performing reception with a directivity when it receives a signal from a user terminal PSI in its own cell, i.e., when base station 1000 performs uplink communication.

This structure can suppress an interference signal from a user terminal PS2 in a peripheral cell, and therefore can prevent lowering of communication quality of the user in its own cell.

Referring to FIG. 2, radio base station 1000 according to the first embodiment of the invention performs non-directional transmission when base station 1000 transmits a signal to user terminal PS1 in its own cell, i.e., when base station 1000 performs downlink communication. Thus, the downlink communication is performed without performing the adaptive array processing, and therefore an adaptive array processing circuit for the downlink communication is not required so that an installation cost of such a circuit can be eliminated.

Figure 3:
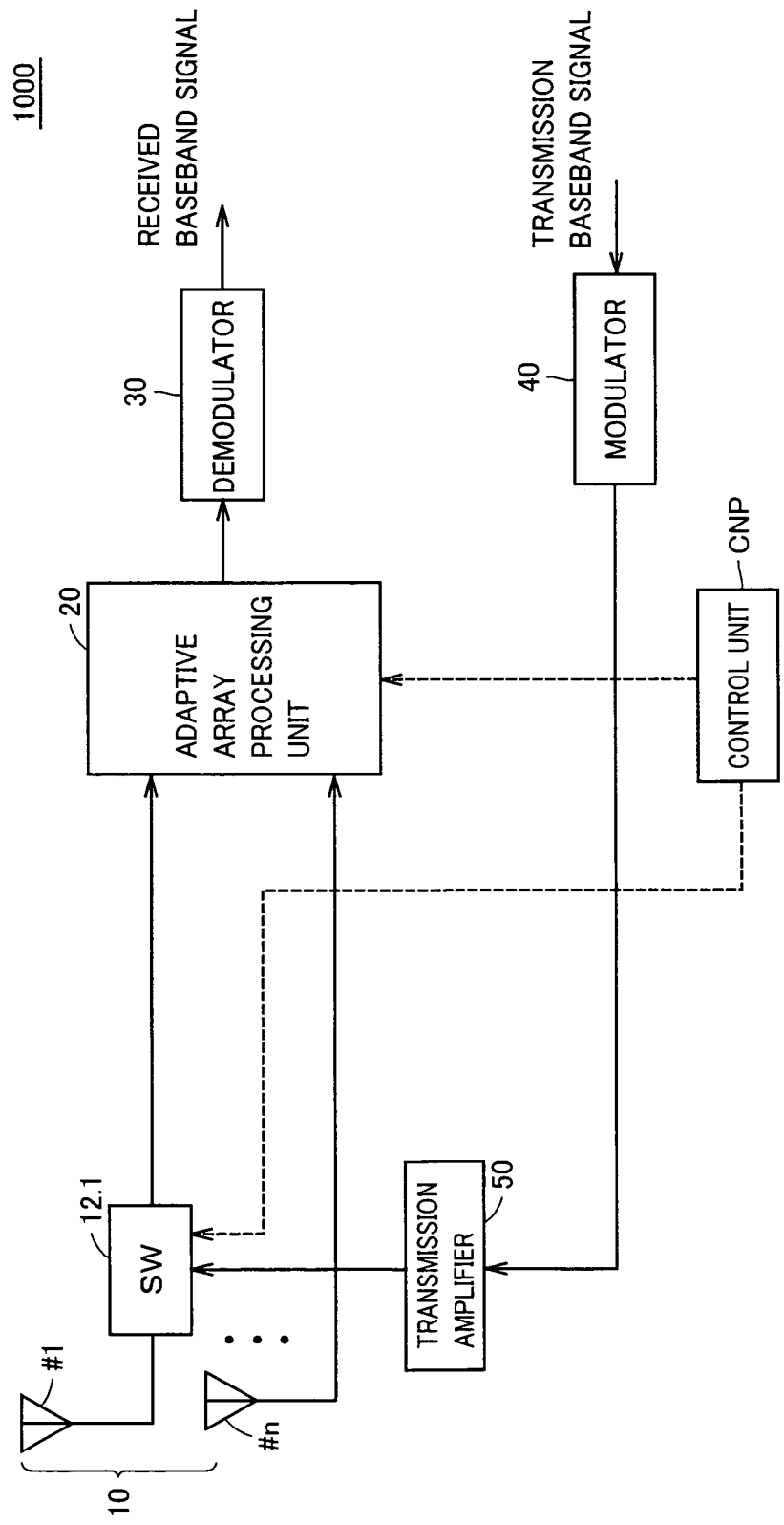
FIG. 3 is a schematic block diagram illustrating a structure of a radio base station 1000 for performing the directivity control illustrated in FIGS. 1 and 2.

FIG. 3 is a schematic block diagram illustrating a structure of radio base station 1000 performing the directivity control already described with reference to FIGS. 1 and 2.

Referring to FIG. 3, radio base station 1000 includes an adaptive array antenna 10 having a plurality of antennas #1-#n, a switch circuit 12.1, which sends a signal received by antenna #1 to radio base station 1000 for performing the adaptive array processing in the receive operation, and provides selectively a transmission signal (i.e., signal to be sent) to antenna #1 in the transmission operation, an adaptive array processing unit 20, which receives the signal sent from switch circuit 12.1 and signals sent from antennas #2-#n, perform the adaptive array processing on the signals received by the plurality of antennas #1-#n, and thereby performs selective separation and extraction of the signal sent from a desired user terminal, a demodulator 30, which receives an output of adaptive array processing unit 20, and performs demodulation and extraction of a baseband signal, a modulator 40, which receives and modulates a baseband signal for transmission, a transmission amplifier 50, which receives an output of modulator 40, amplifies a transmission signal and provides the amplified signal to switch circuit 12.1 corresponding to antenna #1, and a control unit CNP controlling operations of switch circuit 12.1, adaptive array processing unit 20, demodulator 30, modulator 40 and transmission amplifier 50. In FIG. 3, one antenna transmitting the transmission signal is antenna #1. However, the invention is not restricted to this, and the one antenna may be appropriately selected from the plurality of antennas #1-#n.

Functions of radio base station 1000, which will be described below, may be achieved by a processor, which is arranged in control unit CNP for successively executing a series of procedures described by a computer program, and particularly by controlling operations of various components of radio base station 1000 by this processor, although the invention is not restricted to this. This program can be installed into control portion CNP from a record medium bearing the program.

Figure 4:
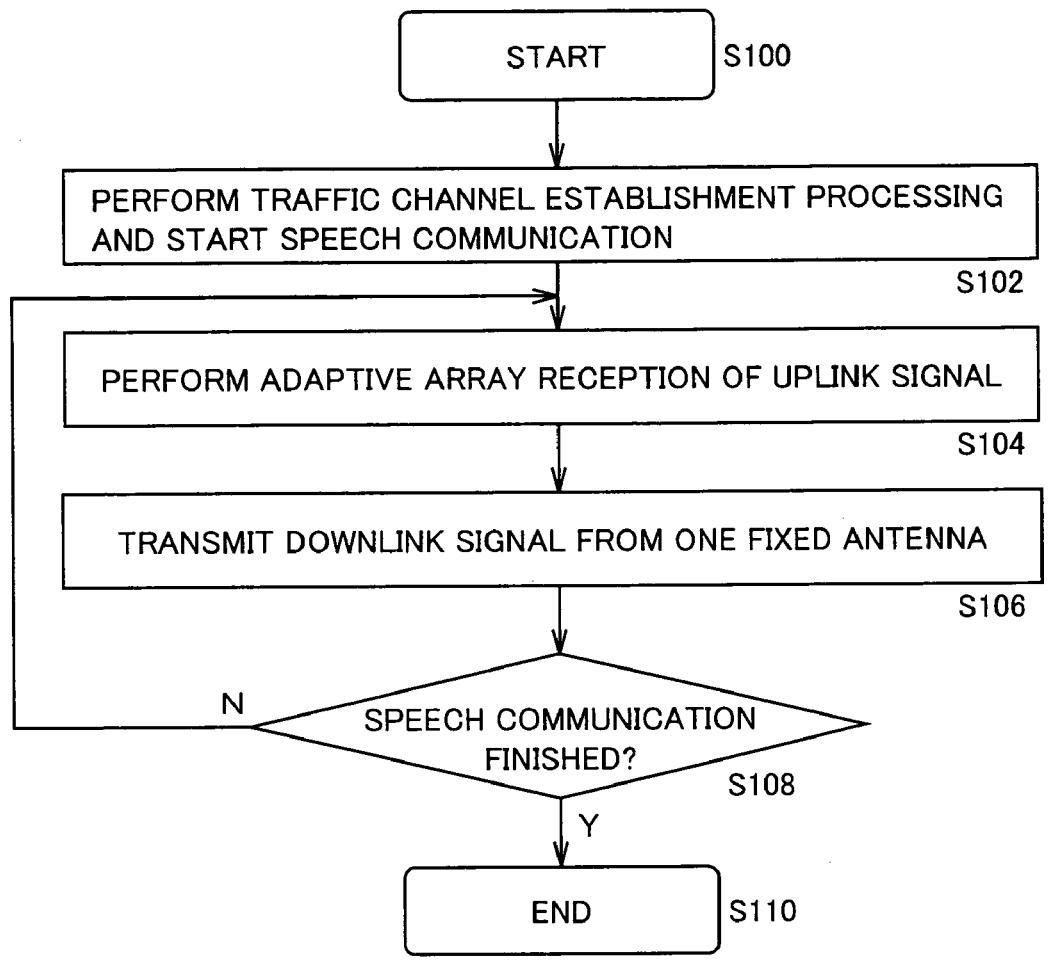
FIG. 4 is a flow chart illustrating an operation of radio base station 1000 shown in FIG. 3.

FIG. 4 is a flowchart illustrating the operation of radio base station 1000 illustrated in FIG. 3.

Referring to FIG. 4, when speech communication processing starts (step S100), communication establishing processing is performed for starting the speech communication (S102). For receiving an uplink signal, control unit CNP controls switch circuit 12.1 and adaptive array processing unit 20 to perform adaptive array receive processing on the uplink signal (step S104).

When a downlink signal is to be sent to the user terminal, which sent the uplink signal, control unit CNP controls switch circuit 12.1 to transmit a signal provided from transmission amplifier 50 via antenna #1 (step S106).

Subsequently, it is determined whether the speech communication state is already finished or not (step S108). If not, the processing returns to step S104.

When it is determined in step S108 that the speech communication state is already finished, the communication processing ends (step S110).

In the uplink communication, the above structure performs the adaptive array processing, and therefore can maintain high communication quality by suppressing interference signals coming from a peripheral cell.

For the downlink communication, the adaptive array processing is eliminated, and therefore the adaptive array processing circuit can be eliminated so that the installation cost of the radio base station can be reduced.

MODIFICATION OF THE FIRST EMBODIMENT

According to the first embodiment, the antenna used for the non-directional transmission is a predetermined one antenna (e.g., antenna #1).

However, antenna #1 among the plurality of antennas #1-#n may not be the optimum antenna for the communication with a certain user terminal PS1.

According to the modification of the first embodiment, the antenna which is most suitable for communication with the radio terminal PS1 within the station's own cell is selected and used in the downlink communication.

Figure 5:
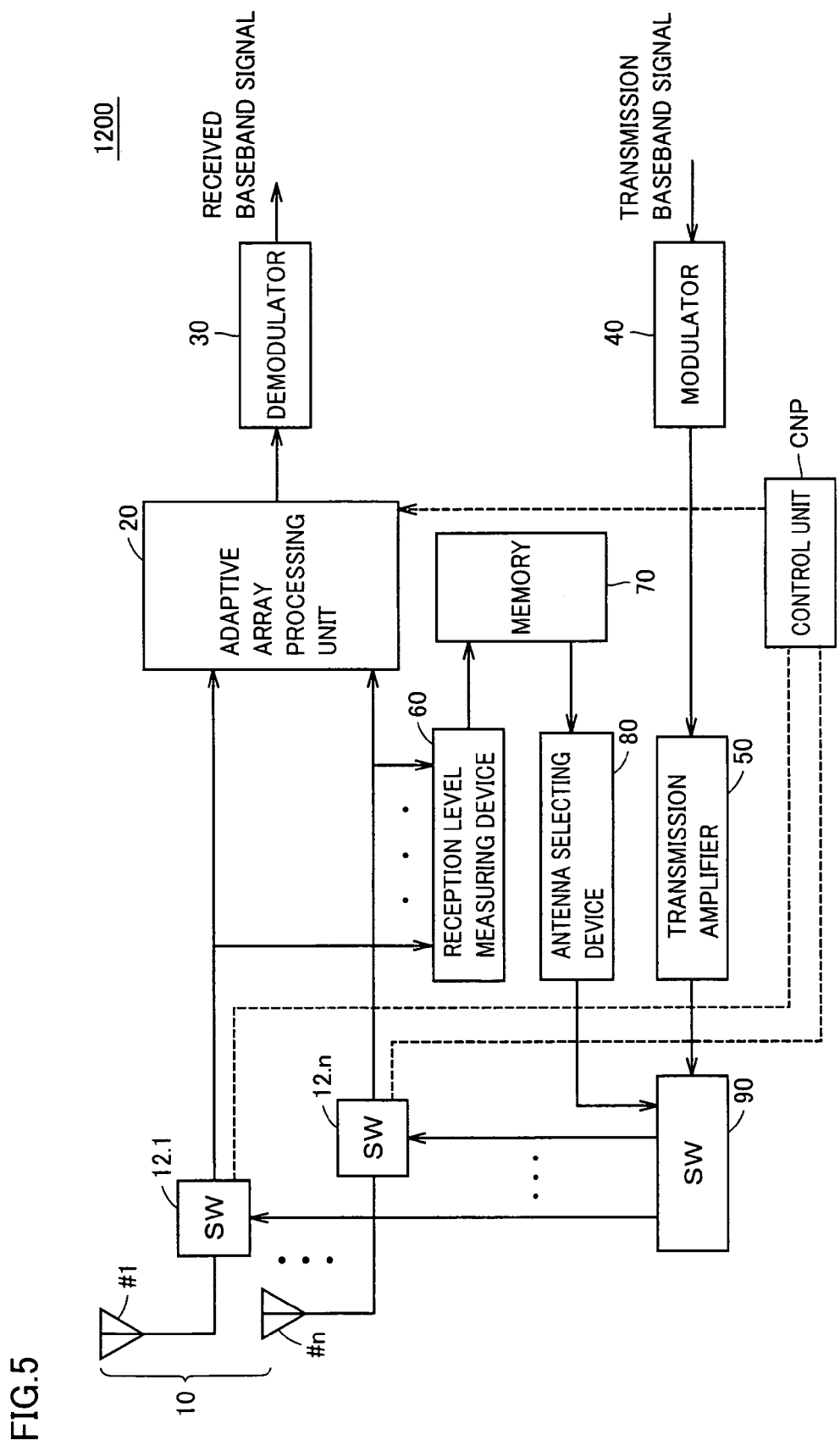
FIG. 5 is a schematic block diagram illustrating a structure of a radio base station 1200 of a modification of the first embodiment.

FIG. 5 is a schematic block diagram illustrating a structure of a radio base station 1200 of the modification of the first embodiment.

The structure of radio base station 1200 differs from that of radio base station 1000 in that switch circuits 12.1-12.n are provided for all antennas #1-#n, respectively, and these switch circuits 12.1-12.n selectively transmit signals sent from antennas #1-#n to internal circuits of radio base station 1200, or provides signals sent from internal circuits of radio base station 1200 to antennas #1-#n, respectively.

Radio base station 1200 further includes a reception level measuring device 60, which receives signals from switch circuits 12.1-12.n, and measures the reception signal levels, a memory 70 storing the reception level of each antenna obtained by reception level measuring device 60, an antenna selecting device 80 selecting the antenna of the highest reception level based on the information stored in memory 70, and a switch circuit 90, which receives an output of transmission amplifier 50, and is controlled by antenna selecting device 80 to provide the output of transmission amplifier 50 selectively to switch circuits 12.1-12.n corresponding to antennas #1-#n, and particularly to the switch circuit corresponding to the antenna of the highest reception level.

Structures other than the above are substantially the same as those of radio base station 1000 of the first embodiment. The same portions bear the same reference numbers, and description thereof is not repeated.

Figure 6:
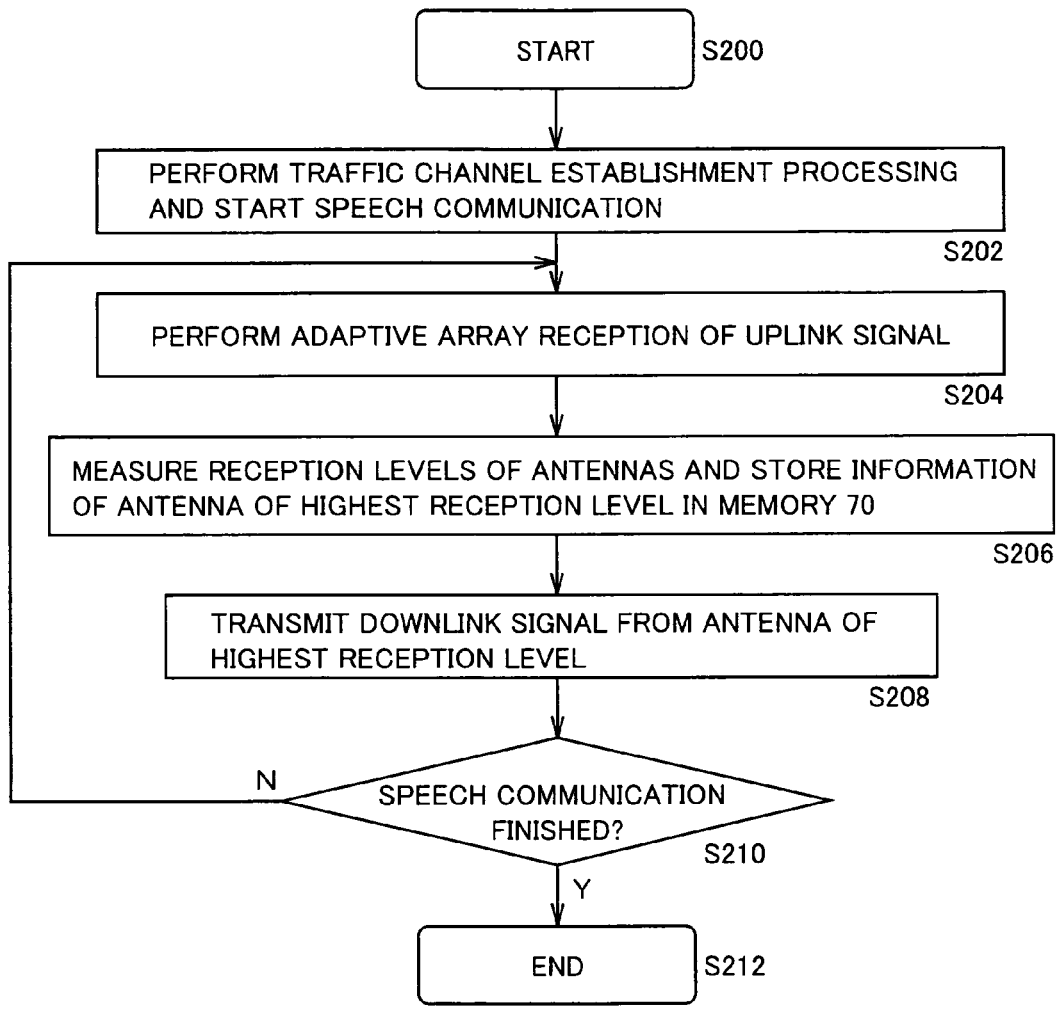
FIG. 6 is a flow chart illustrating an operation of radio base station 1200 of the modification of the first embodiment illustrated in FIG. 5.

FIG. 6 is a flowchart illustrating the operation of radio base station of the modification of the first embodiment illustrated in FIG. 5.

When the speech communication processing starts (step S200), processing of establishing a traffic channel is performed, and the speech communication starts (step S202).

Then, adaptive array reception of an uplink signal is performed (step S204). The reception levels of the respective antennas are measured, and memory 70 stores information of the antenna of the highest reception level (step S206).

Based on the reception level information stored in memory 70, the downlink signal is transmitted via the antenna of the highest reception level (step S208).

When the transmission is completed, it is then determined whether the speech communication state is finished or not (step S210). When the speech communication is not finished, the processing returns to step S204.

When it is determined that the speech communication is already finished, the speech communication processing ends (step S212).

In the uplink communication, the above structure maintains the communication quality by performing the adaptive array processing. In the downlink communication, the above structure transmits the signal by selectively using the antenna of the highest reception level. Therefore, the radio base station can maintain the quality of communication with the radio user terminal within the its own cell.

SECOND EMBODIMENT

According to a second embodiment, the adaptive array processing is performed in the uplink communication, and the non-directional transmission is performed in the downlink communication. Further, in the downlink communication, a transmission power is controlled in accordance with a reception power in the uplink communication as described below.

Figure 7:
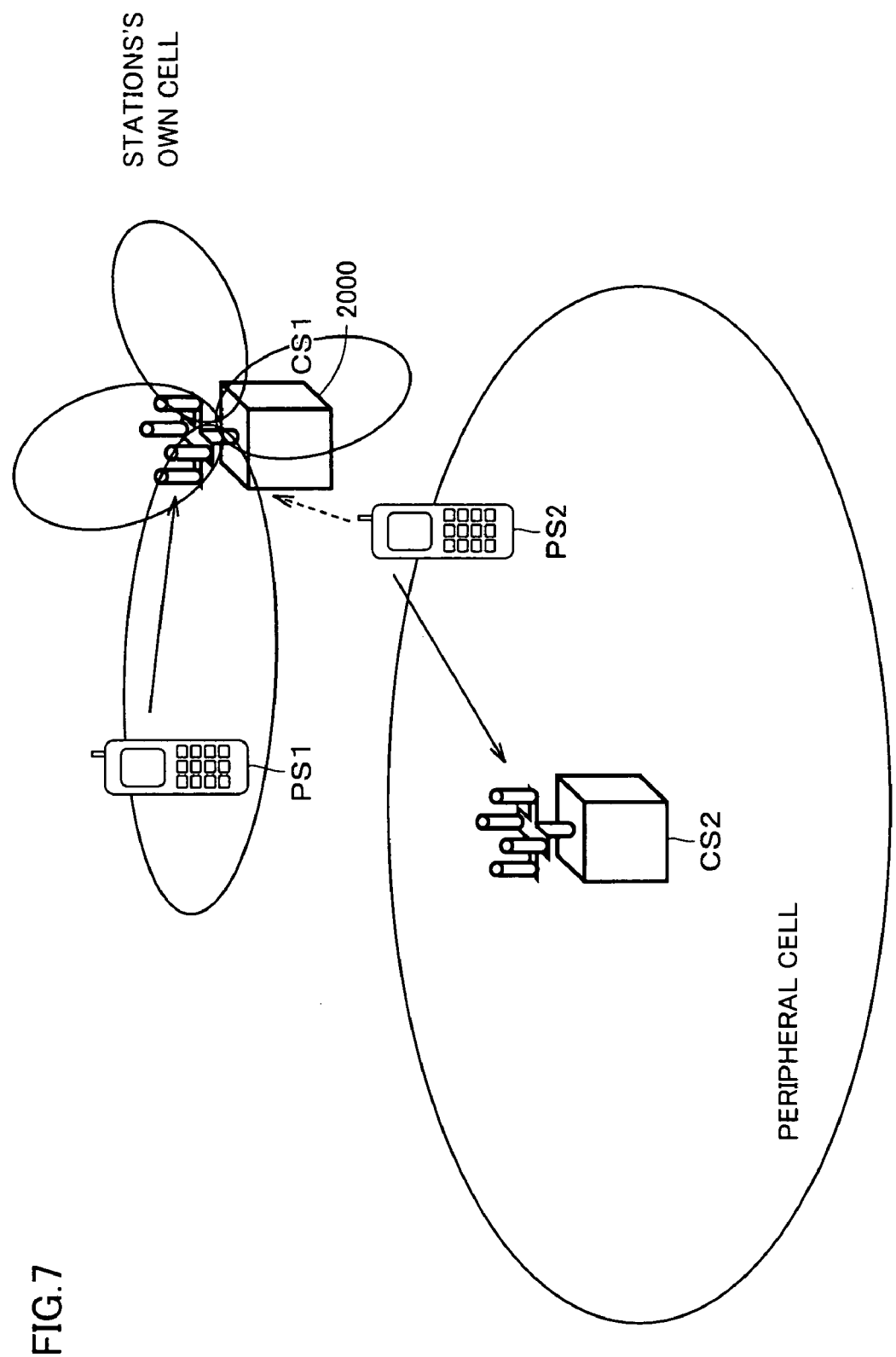
FIG. 7 is a conceptual view illustrating a transmission directivity in uplink communication according to the second embodiment.
Figure 8:
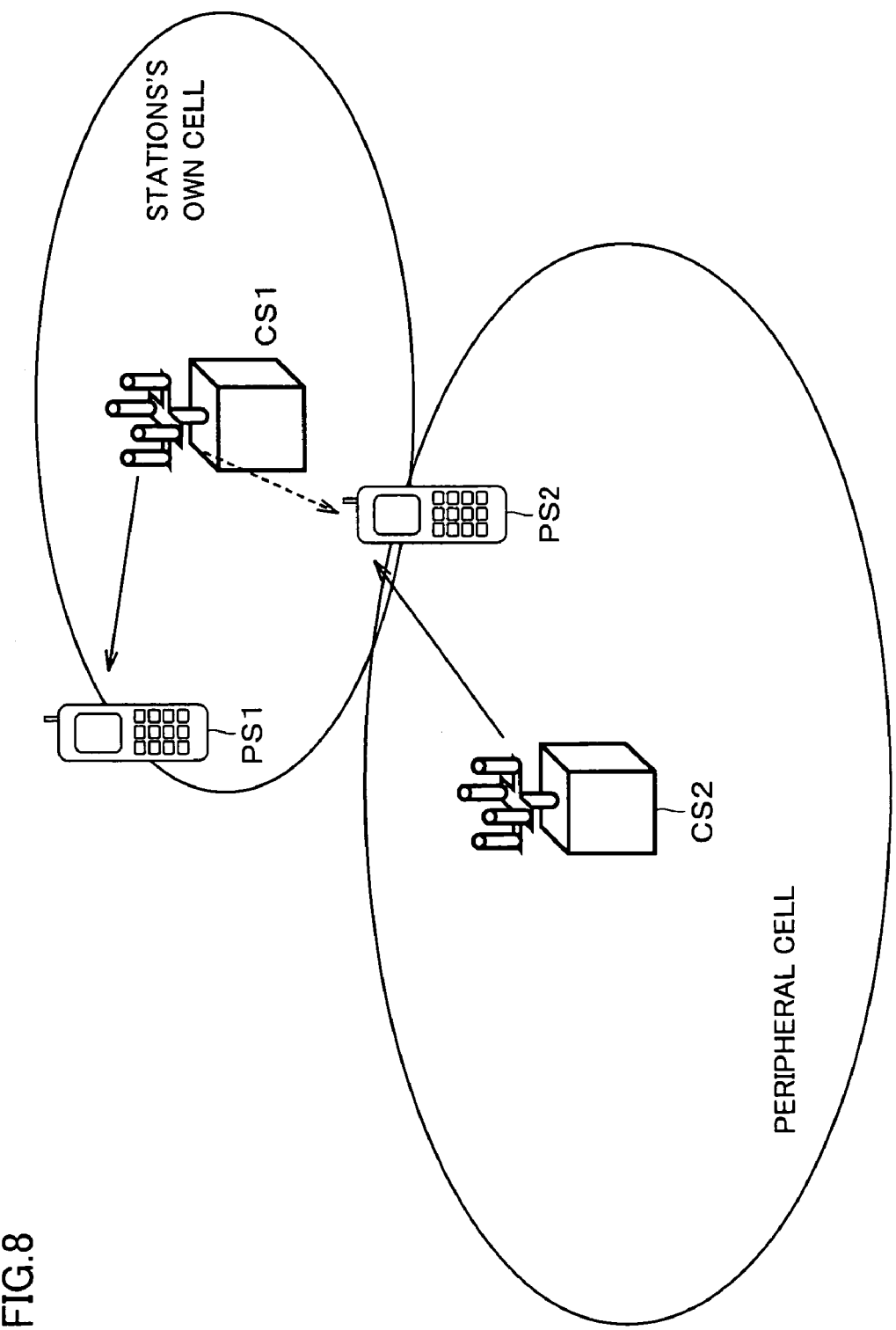
FIG. 8 is a conceptual view illustrating the transmission directivity in the downlink communication as well as a range of waves.

FIG. 7 is a conceptual view illustrating a transmission directivity in the uplink communication according to the second embodiment. FIG. 8 conceptually illustrates the transmission directivity in the downlink communication as well as a range of waves.

In the uplink communication illustrated in FIG. 7, since the reception with the directivity is performed by the adaptive array processing, interference from the uplink communication by a user terminal in the peripheral cell can be suppressed, and the lowering of the communication quality of the user in the station's own cell can be prevented.

Referring to FIG. 8, the transmission power in the downlink communication is suppressed within a level allowing communication of the user in the station's own cell so that the interference with the peripheral cell is reduced, and the reduction in communication quality of the peripheral cell user can be prevented. Further, in the downlink communication, the adaptive array processing is not performed so that the adaptive array processing circuit corresponding to the downlink communication can be eliminated, and therefore the installation cost of a base station 2000 can be reduced.

Figure 9:
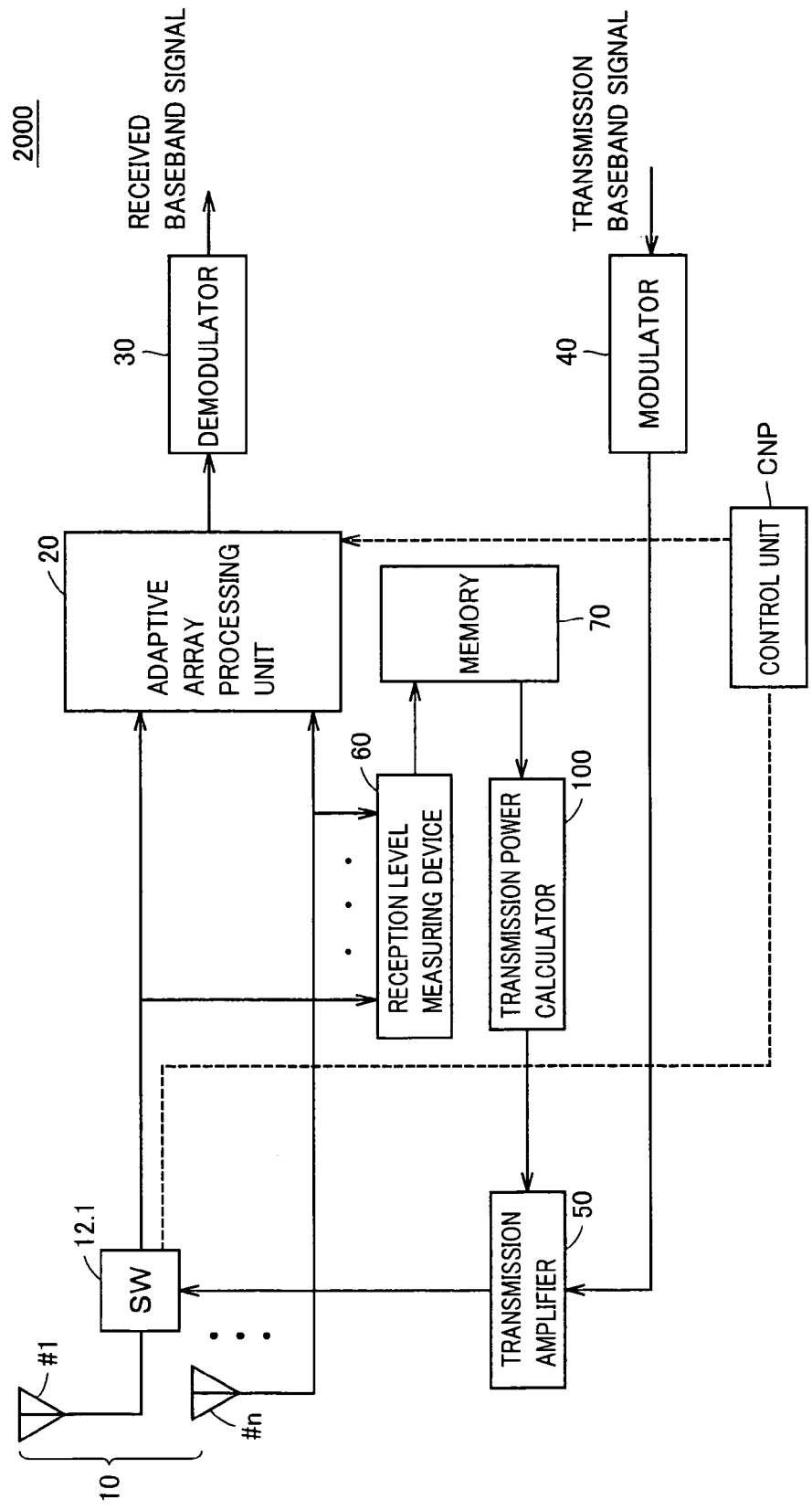
FIG. 9 is a schematic block diagram illustrating a structure of a radio base station 2000 according to the second embodiment.

FIG. 9 is a schematic block diagram illustrating a structure of radio base station 2000 of the second embodiment illustrated in FIGS. 7 and 8.

This structure differs from the structure of radio base station 1000 of the first embodiment illustrated in FIG. 3 in that radio base station 2000 includes reception level measuring device 60, which receives signals from respective antennas #1-#n, and measures the reception levels thereof, memory 70 storing a conversion table, which represents a relationship of the reception level measured by reception level measuring device 60 with respect to the preset reception level and the transmission power (and will be referred to as a "reception level/transmission power conversion table"), and a transmission power calculator 100, which calculates the transmission power from the reception level of the predetermined antenna (e.g., antenna #1) based on the reception level/transmission power conversion table in memory 70, and controls the output level of transmission amplifier 50.

For example, the reception level/transmission power conversion table is prepared in advance by an experiment, in which the transmission power required for the communication with the terminal is determined with respect to the reception level, and is stored in memory 70, although another manner may be employed.

Structures other than the above are substantially the same as those of radio base station 1000 of the first embodiment illustrated in FIG. 3. The same parts bear the same reference numbers, and description thereof is not repeated.

Figure 10:
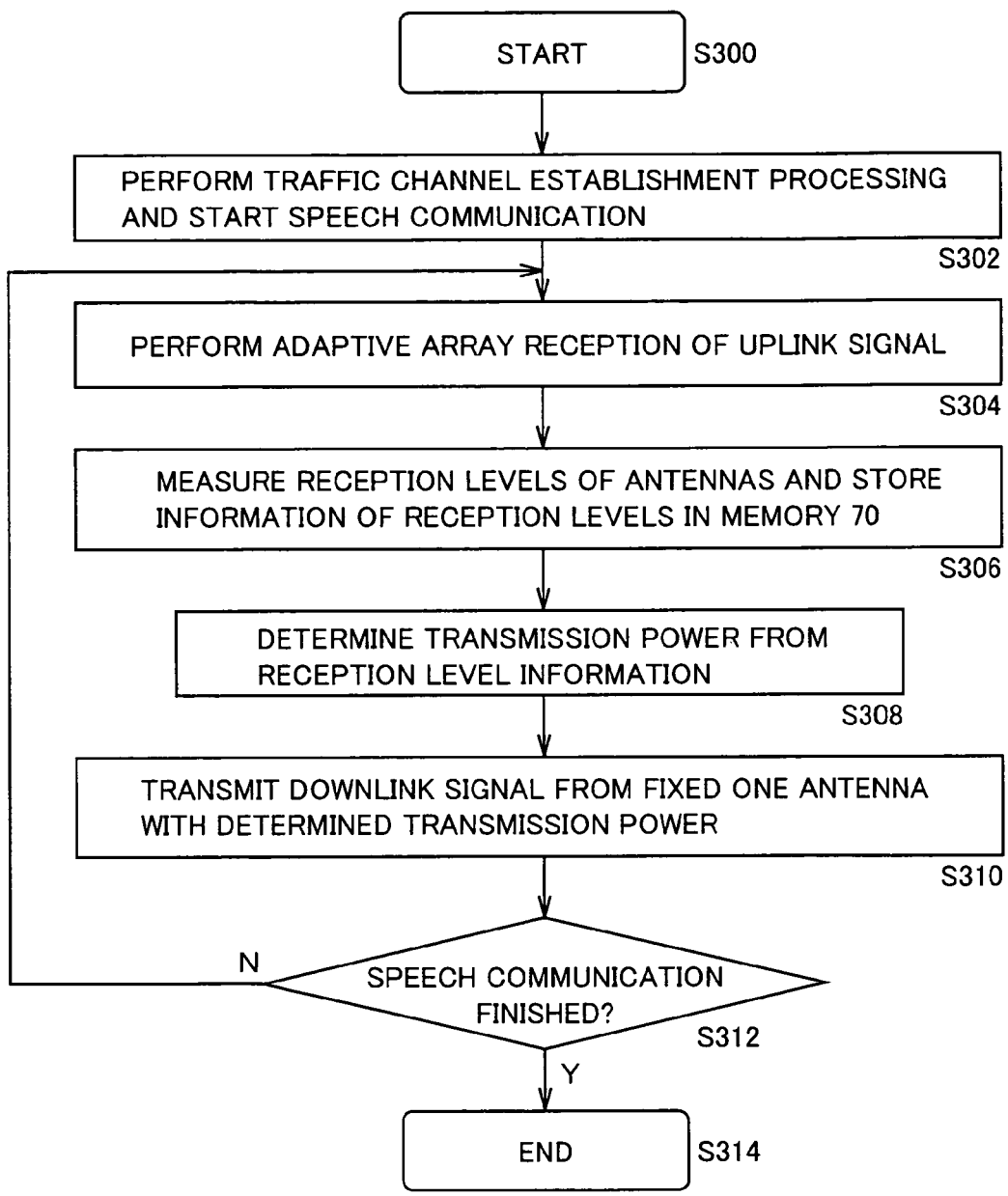
FIG. 10 is a flowchart illustrating an operation of radio base station 2000 according to the second embodiment of the invention illustrated in FIG. 9.

FIG. 10 is a flowchart illustrating the operation of radio base station 2000 of the second embodiment illustrated in FIG. 9.

Referring to FIG. 10, when the speech communication processing starts (step S300), processing of establishing the traffic channel is performed, and the speech communication starts (step S302).

Subsequently, the reception is performed by effecting the adaptive array processing on the uplink signal (step S304), and memory 70 stores results obtained by measuring the reception levels of the respective antennas (step S306).

For transmitting the signal to the user in the station's own cell, the transmission power is determined from the reception level information based on the reception level/transmission power conversion table (step S308), and the downlink signal is transmitted from predetermined antenna #1 with the transmission power suppressed to the power level, which is estimated from the reception level as the level required for the transmission (step S310).

Subsequently, it is determined whether the speech communication is already finished or not. If not, the processing returns to step S304.

When it is determined in step S308 that the communication is already finished, the speech communication processing ends (step S314).

According to the structures described above, it is possible to control the uplink communication and downlink communication as illustrated in FIGS. 7 and 8.

MODIFICATION OF SECOND EMBODIMENT

Figure 11:
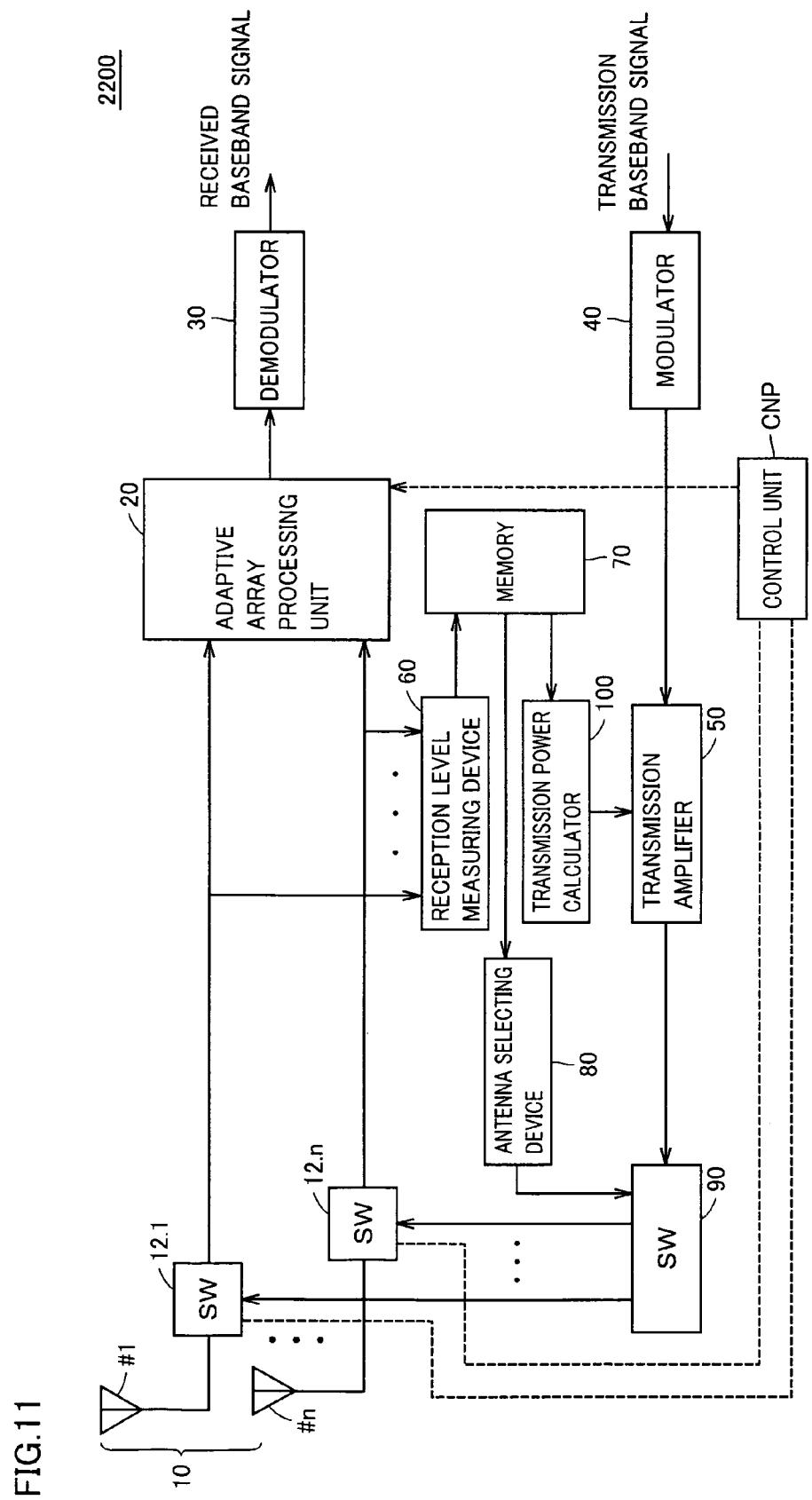
FIG. 11 is a schematic block diagram illustrating a structure of a radio base station 2200, which is a modification of radio base station 2000 according to the second embodiment illustrated in FIG. 9.

FIG. 11 is a schematic block diagram illustrating a structure of a radio base station 2200, which is a modification of radio base station 2000 of the second embodiment already described with reference to FIG. 9.

The structure of radio base station 2200 differs from that of radio base station 2000 of the second embodiment illustrated in FIG. 9 in that switch circuits 12.1-12.n are provided corresponding to respective antennas #1-#n for switching transmission paths of the signals to and from the antennas in the transmission and reception operations.

Further, radio base station 2200 includes antenna selecting device 80 for selecting the antenna of the highest reception level in accordance with the reception levels of the respective antennas stored in memory 70, and switch circuit 90 for providing the output of transmission amplifier to one of switch circuits 12.1-12.n, which corresponds to the antenna selected by antenna selecting device 80.

Other structures are the same as those of radio base station 2000 of the second embodiment illustrated in FIG. 9. The same portions bear the same reference numbers, and description thereof is not repeated.

Figure 12:
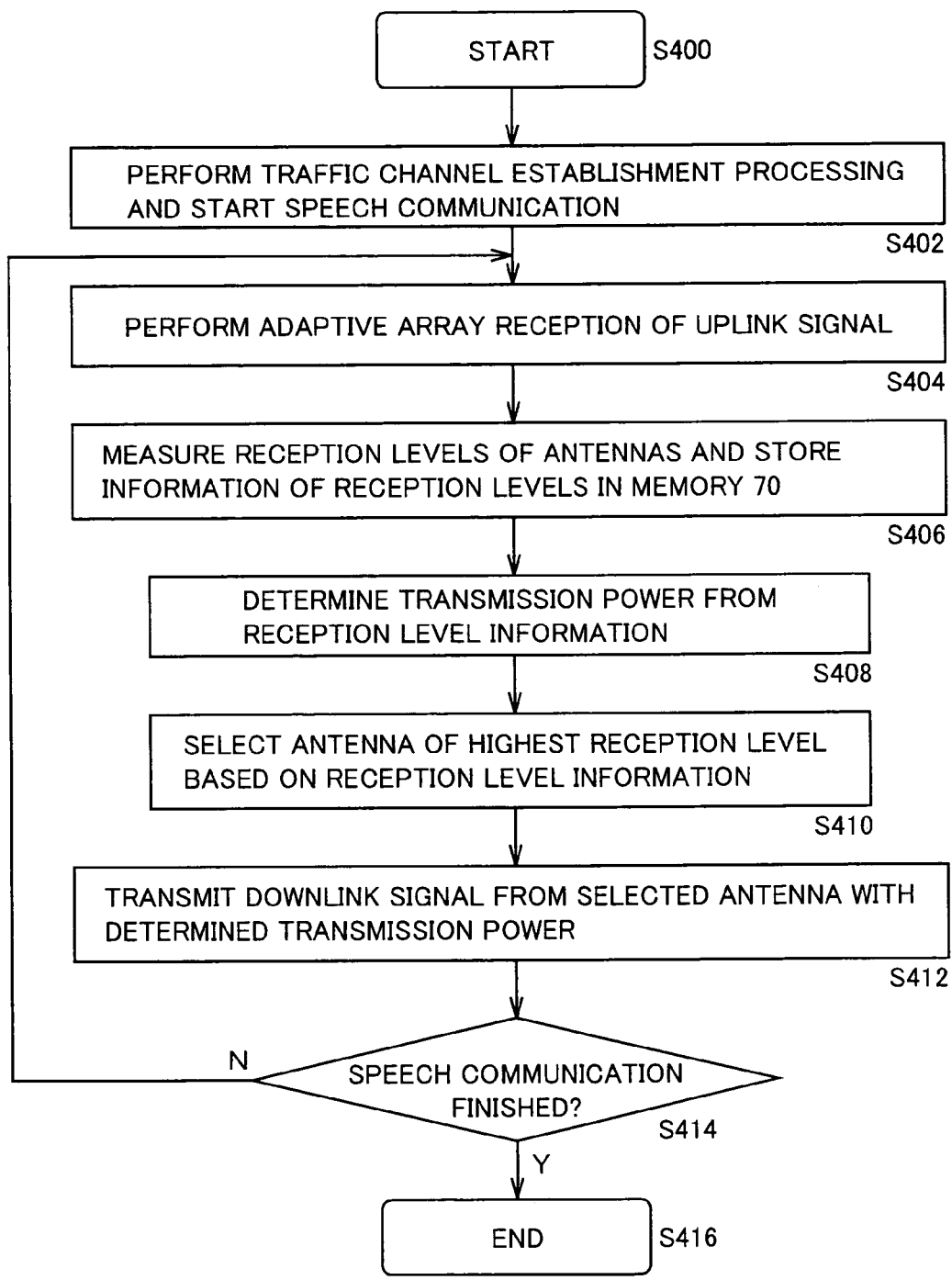
FIG. 12 is a flowchart illustrating an operation of radio base station 2200 of the modification of the second embodiment illustrated in FIG. 11.

FIG. 12 is a flowchart illustrating the operation of radio base station 2200 of the modification of the second embodiment illustrated in FIG. 11.

Referring to FIG. 12, when the speech communication processing starts (step S400), processing of establishing a traffic channel is performed, and the speech communication starts (step S402).

Subsequently, adaptive array reception of an uplink signal is performed, and the signal sent from the user is separated (step S404). The reception levels of the respective antennas are measured, and memory 70 stores information of the reception levels (step S406).

When the signal is to be transmitted to the user's terminal, the transmission power, which is required for the transmission, is determined from the reception level information according to the reception level/transmission power conversion table in memory 70 (step S408). Further, the antenna of the highest reception level is selected from the reception level information (step S410), and the downlink signal is transmitted from the selected antenna with the transmission power determined in step S408 (step S412).

Subsequently, it is determined whether the speech communication is already finished or not (step S414). When the speech communication processing is not yet finished, the processing returns to step S404.

When it is determined in step S414 that the speech communication is already finished, the speech communication processing ends (step S416).

The structure described above can maintain the communication quality in both the uplink communication and downlink communication, and can suppress the interference with the peripheral cell.

THIRD EMBODIMENT

According to the structure of the second embodiment already described, the radio base station suppresses the transmission power in accordance with the reception level related to the terminal in the station's own cell. However, the level of the interference power provided from the peripheral cell may be low, e.g., in such a case that a distance to a base station of the peripheral cell is relatively large. If the above level is low, it is not necessary in some cases to suppress the transmission power level depending on only the reception level related to the terminal in the station's own cell.

In the third embodiment, the adaptive array processing is performed in the uplink communication, and the non-directional transmission is performed in the downlink communication. Further, the downlink transmission power is controlled in accordance with the uplink reception power and the carrier sense level.

FIGS. 13–16. are conceptual views illustrating a method of controlling the transmission power and the transmission directivity according to the third embodiment.

Figure 13:
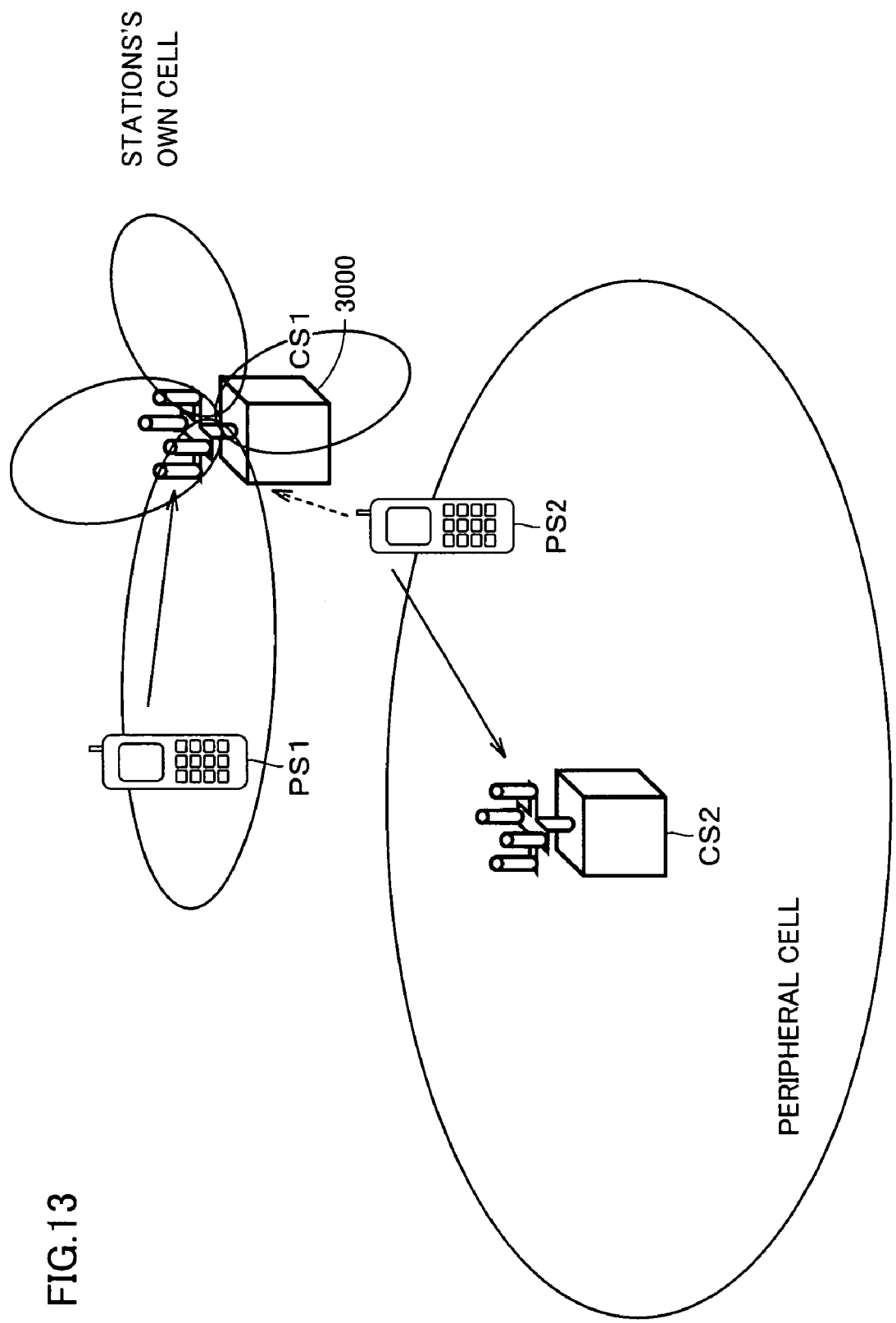
FIG. 13 is a first conceptual view illustrating a method of controlling a transmission power and a transmission directivity according to a third embodiment of the invention.
Figure 14:
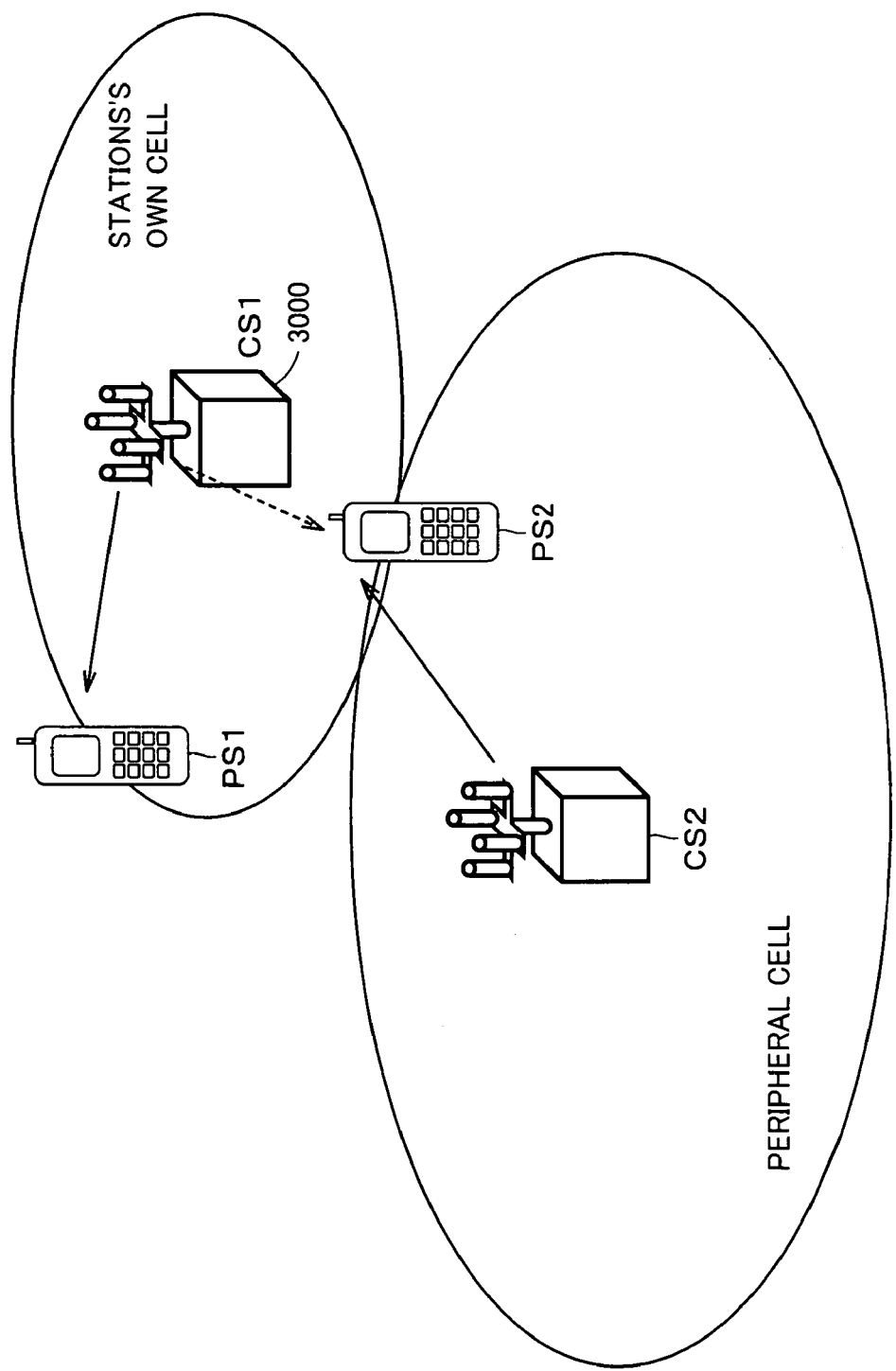
FIG. 14 is a second conceptual view illustrating the method of controlling the transmission power and the transmission directivity according to the third embodiment.

FIGS. 13 and 14 illustrate a state, in which a distance to the peripheral cell is relatively short, and interference with a terminal PS2 in the peripheral cell may cause a problem.

Referring to FIG. 13, a radio base station 3000 of the third embodiment performs the adaptive array processing in the uplink communication operation of receiving the signal from terminal device PS1 of the user in the station's own cell. Therefore, interference in the uplink communication can be suppressed so that lowering of communication quality of the user in the station's own cell can be prevented.

Referring to FIG. 14, the downlink transmission power in the downlink communication is suppressed to the level allowing communication of the user in the station's own cell. Therefore, the interference with the peripheral cell is reduced, and the lowering of the communication quality of the user in the peripheral cell can be prevented.

Figure 15:
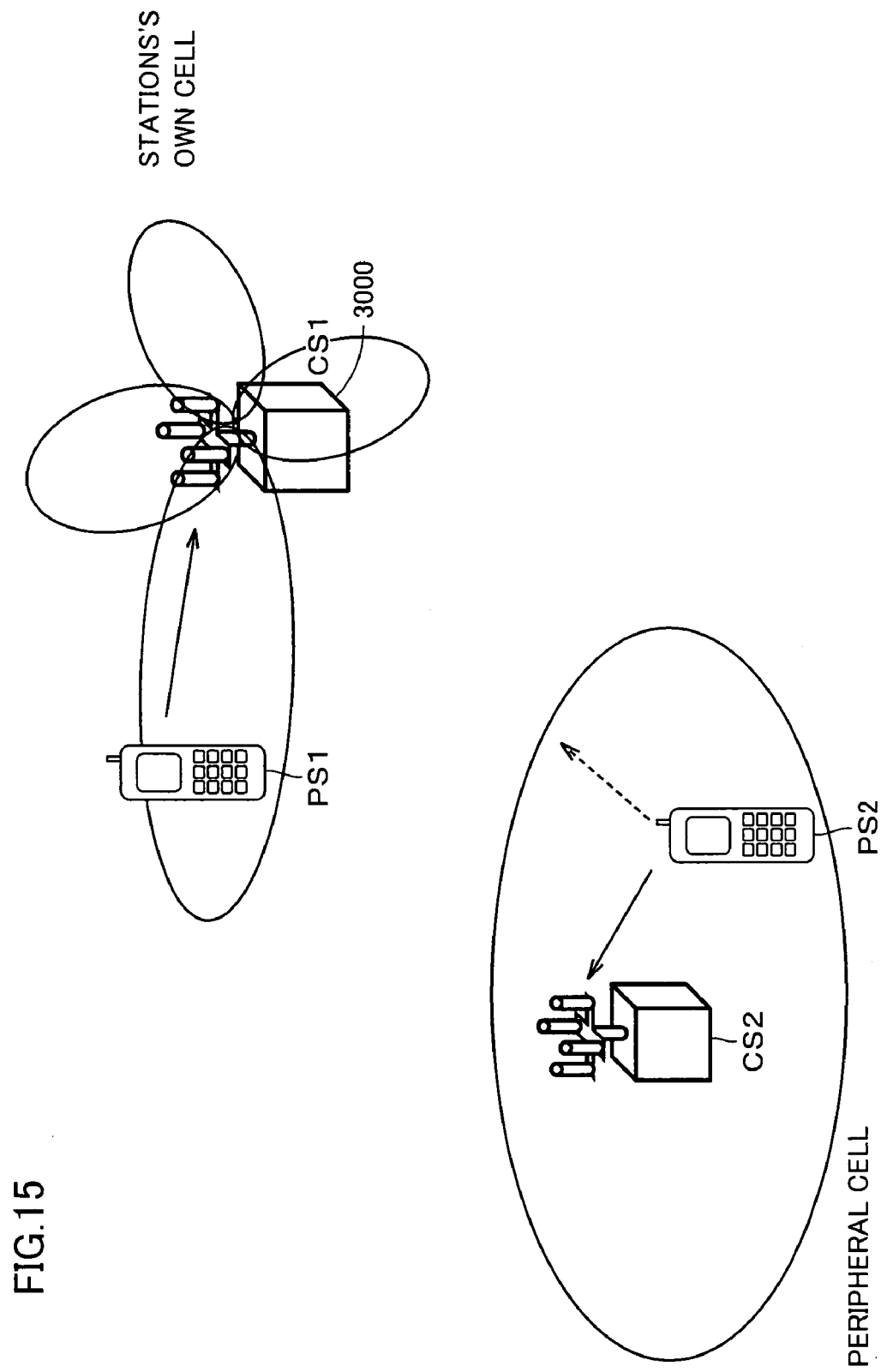
FIG. 15 is a third conceptual view illustrating the method of controlling the transmission power and the transmission directivity according to the third embodiment.
Figure 16:
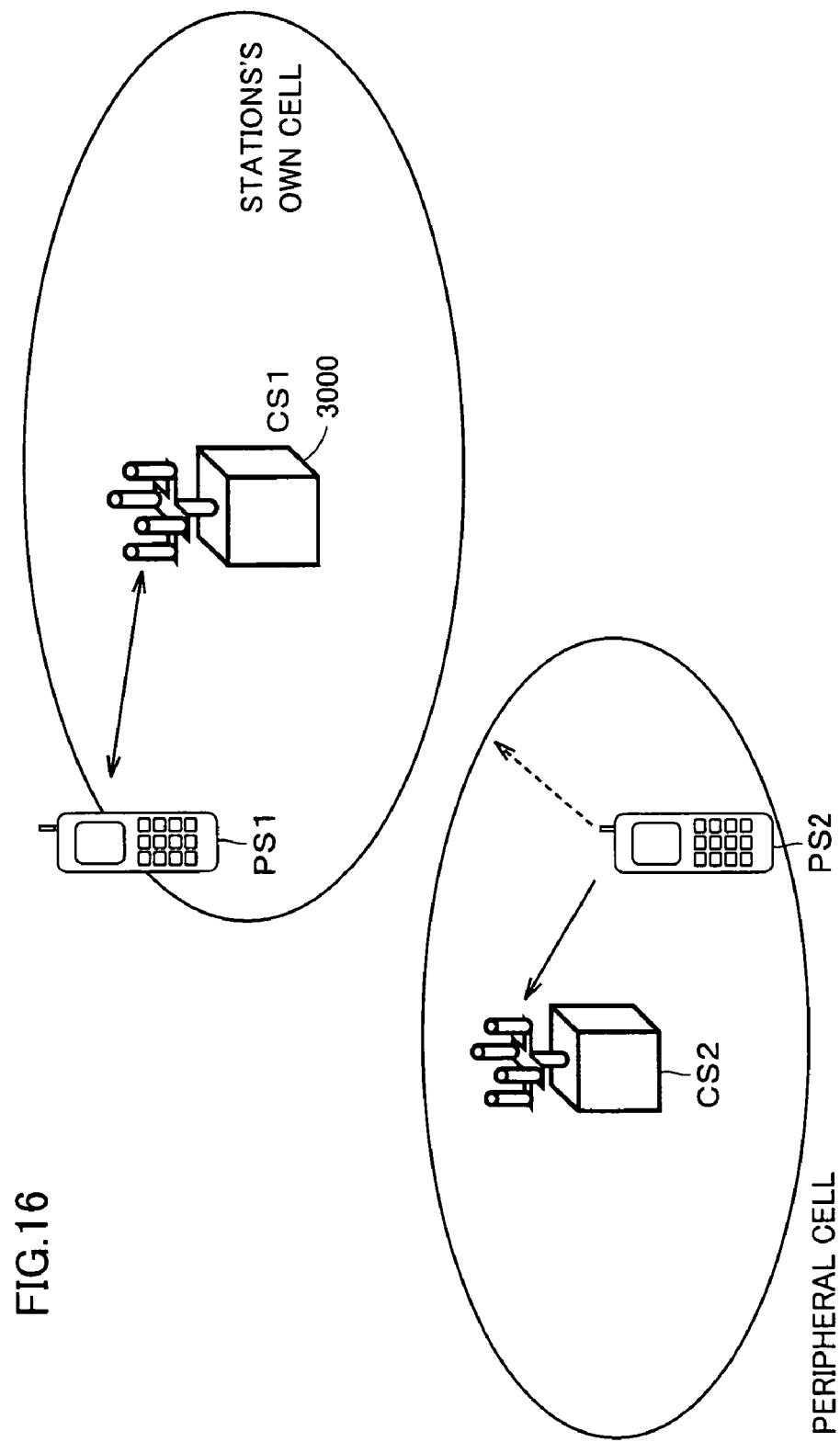
FIG. 16 is a fourth conceptual view illustrating the method of controlling the transmission power and the transmission directivity according to the third embodiment.

FIGS. 15 and 16 illustrate a state, in which the distance to the peripheral cell is relatively long, and the interference with terminal PS2 in the peripheral cell may cause a problem.

FIG. 15 is a conceptual view illustrating a manner of suppressing interference in the uplink communication.

In FIG. 15, a peripheral cell using the same frequency at the same time is remote from radio base station 3000. In this state, radio base station 3000 performs the reception with the transmission directivity when the uplink communication is performed with radio terminal PS1 of the user in the station's own cell. Therefore, it is possible to suppress the interference from the peripheral cell, and thereby to maintain the communication quality of the user in the station's own cell.

In the downlink communication, as illustrated in FIG. 16, processing is performed based on the reception level of the signal, which is sent from user terminal PS1 in the station's own cell, to suppress the downlink transmission power to an extent allowing communication by the peripheral cell user. The extent of this suppression is controlled in accordance with the level of the carrier sense sensing the level of the signal provided from the peripheral cell, and the suppression is not performed to an extent exceeding the necessary extent. For example, it may be determined that the suppression of the transmission level can be eliminated without substantially affecting the communication with terminal PS2 in the peripheral cell. In this case, the downlink communication may be performed with the transmission power of the original or initial setting value.

Thus, a margin can be ensured in the transmission power of the station's own cell user, and a high resistance to fading variations can be ensured. Therefore, it is possible to prevent deterioration in downlink communication quality of the station's own cell user.

Figure 17:
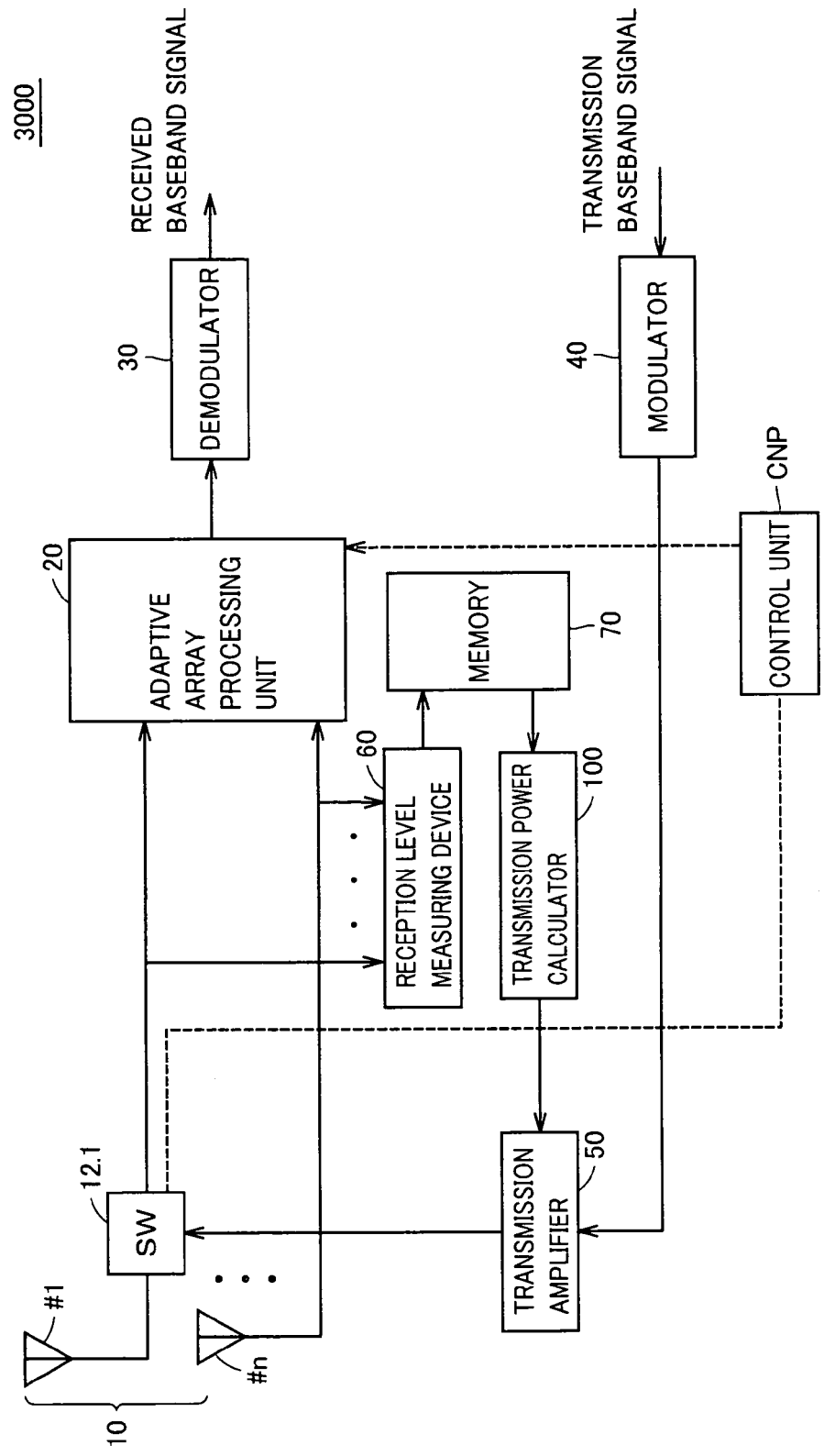
FIG. 17 is a schematic block diagram illustrating a structure of a radio base station 3000 according to the third embodiment.

FIG. 17 is a schematic block diagram illustrating the structure of radio base station 3000 of the third embodiment illustrated in FIGS. 13 to 16.

This structure differs from the structure of radio base station 2000 of the second embodiment illustrated in FIG. 9 in that reception level measuring device 60 measures not only the reception level of the signal coming from terminal PS1 in the station's own cell but also the reception level of the signal coming from terminal PS2 in the peripheral cell, and stores them in memory 70. The "reception level/transmission power conversion table" stored in memory 70 is prepared to define the transmission power level corresponding to not only the reception level of the signal coming from the terminal in the station's own cell but also the received level of the signal coming from the peripheral cell.

For example, the "reception level/transmission power conversion table" is configured in advance by an experiment similarly to the second embodiment, and more specifically is configured such that, when the reception level of the signal coming from the peripheral cell takes a predetermined value (which is represented by PW1 in the following description) or more, the transmission power level initially taking a predetermined initial value is successively suppressed in accordance with increase in reception level of the signal coming from terminal PS1 in the station's own cell. It is also configured such that, when the reception level of the signal coming from the peripheral cell is lower than predetermined value PW1, the transmission power level maintains the predetermined initial value independently of the reception level of the signal coming from terminal PS1 in the station's own cell.

The structure of the "reception level/transmission power conversion table" is not restricted to the above, and it is merely required to suppress an influence, which is exerted by the downlink communication with terminal PS1 in the station's own cell on the communication between terminal PS2 in the peripheral cell and base station CS2 in the peripheral cell. For example, the table may be configured such that, when the reception level obtained from the peripheral cell is lower than predetermined value PW1, the transmission power level increases from the predetermined initial value in accordance with the reception level of the signal coming from terminal PS1 in the station's own cell.

Further, transmission power calculator 100 controls the output level of transmission amplifier 50 by calculating the transmission power based on the reception level of the predetermined antenna (e.g., antenna #1) according to the reception level transmission power conversion table in memory 70, which is preset as described above.

Other structures are the same as those of radio base station 2000 of the second embodiment illustrated in FIG. 9. The same portions bear the same reference numbers, and description thereof is not repeated.

Figure 18:
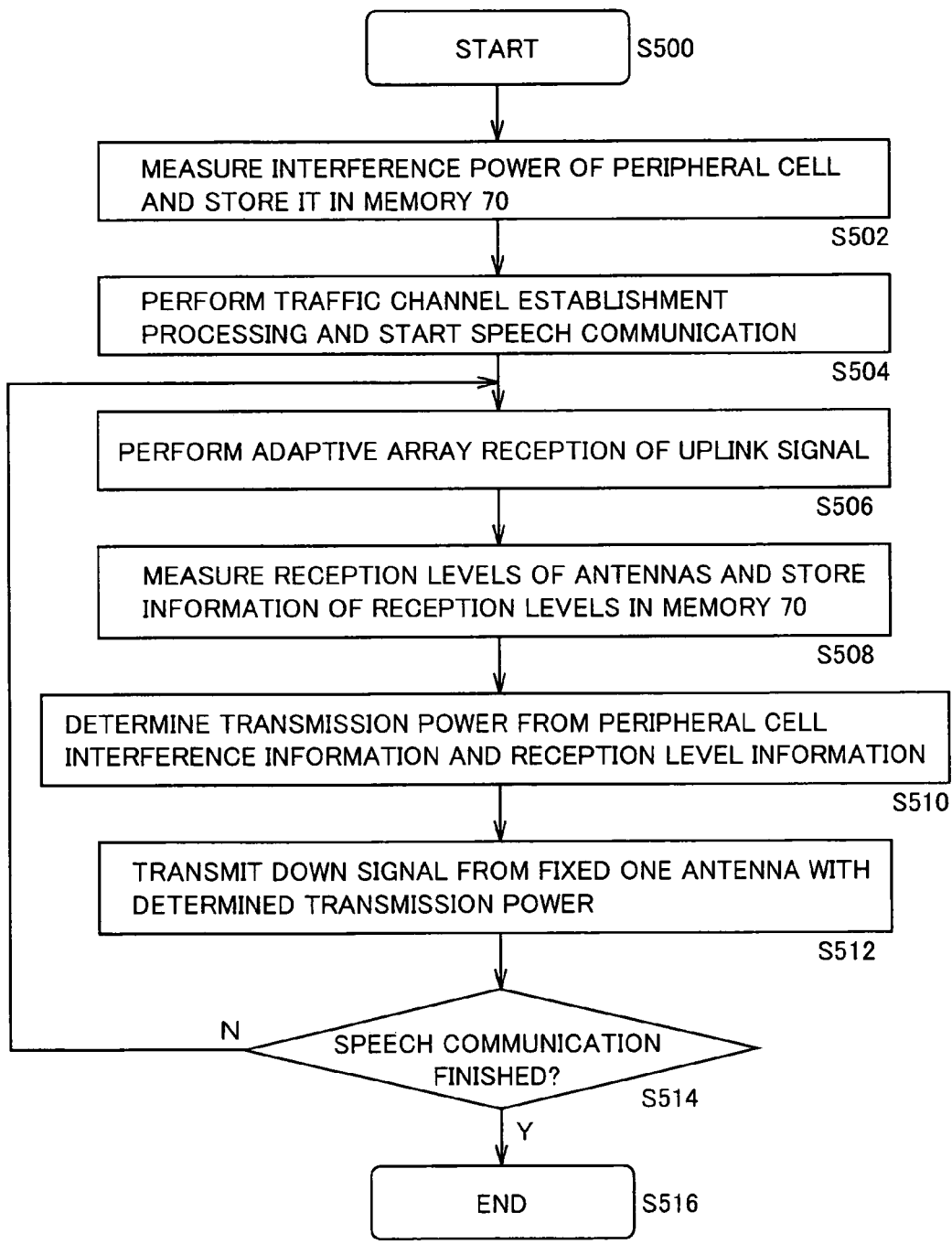
FIG. 18 is a flowchart illustrating an operation of radio base station 3000 according to the third embodiment of the invention.

FIG. 18 is a flowchart illustrating an operation of radio base station 3000 of the third embodiment illustrated in FIG. 17.

Referring to FIG. 18, when the speech communication processing starts (step S500), reception level measuring device 60 measures the interference power applied from the peripheral cell based on the reception signals sent from antennas #1-#n, and stores it in memory 70 (step S502). Subsequently, processing of establishing the traffic channel is performed, and the speech communication starts (step S504).

Then, the uplink signal is received by performing the adaptive array processing (step S506), and memory 70 stores measured reception levels of the respective antennas (step S508).

For transmitting the signal to the user in the station's own cell, the transmission power is determined according to the reception level/transmission power conversion table and based on the information thus stored in memory 70, i.e., based on the information of the interference power applied from the peripheral cell and the information of the reception level obtained from the terminal in the station's own cell (step S510). The transmission power is controlled to attain the power level, which is required for transmission according to estimation from the interference power and the reception level, and the downlink signal is sent from fixed antenna #1 with the transmission power thus calculated (step S512).

Subsequently, it is determined whether the speech communication is already finished or not. When the speech communication processing is not finished, the processing returns to step S506.

When it is determined in step S514 that the speech communication is already finished, the speech communication processing ends (step S516).

The structure described above can control the uplink communication and downlink communication as already described with reference to FIGS. 13 to 16.

MODIFICATION OF THIRD EMBODIMENT

Figure 19:
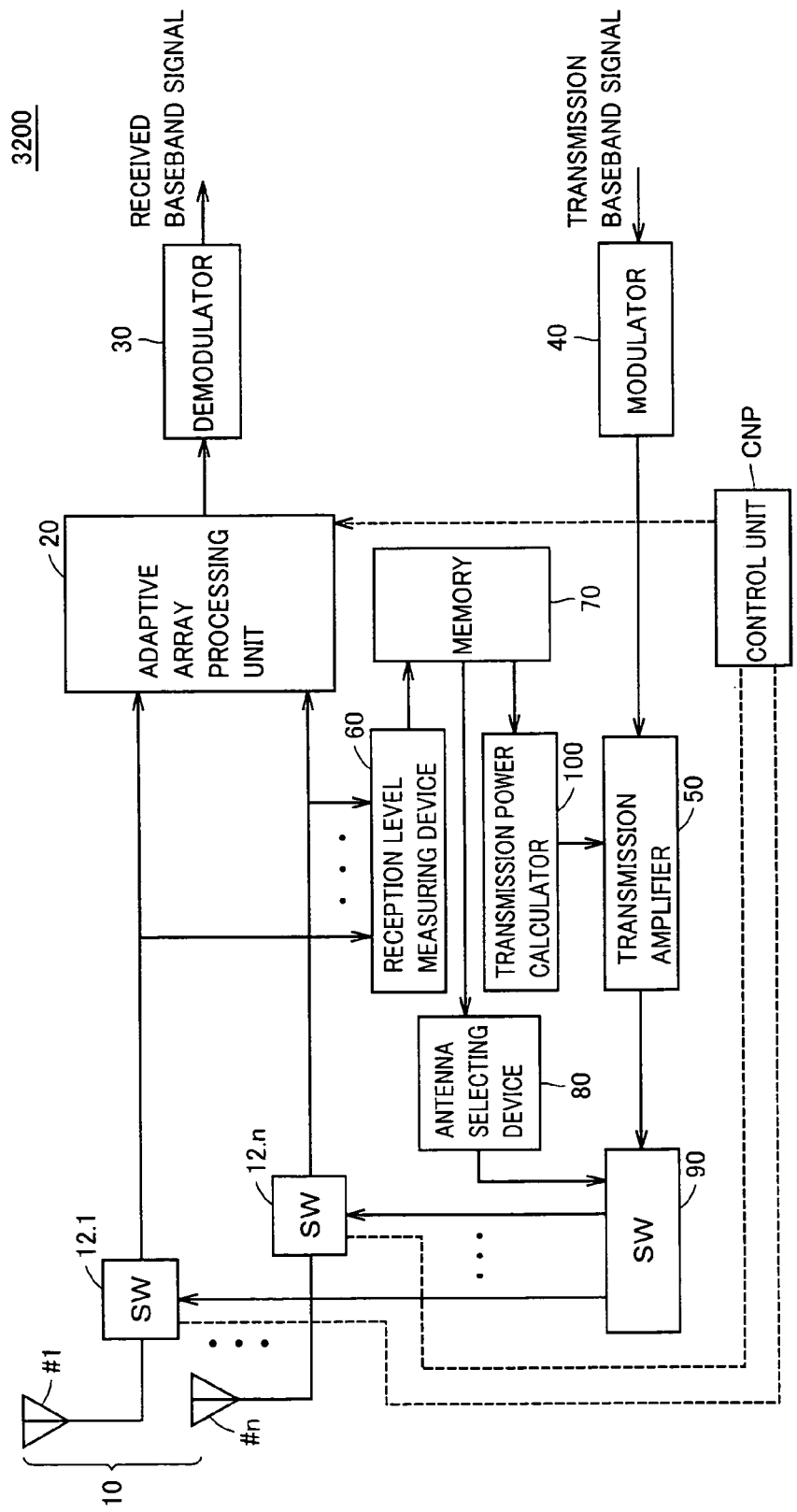
FIG. 19 is a schematic block diagram illustrating a structure of a radio base station 3200 of a modification of the third embodiment.

FIG. 19 is a schematic block diagram illustrating a structure of a radio base station 3200, which is a modification of radio base station 3000 of the third embodiment illustrated in FIG. 17.

The structure of radio base station 3200 differs from that of radio base station 3000 of the third embodiment in that switch circuits 12.1-12.n are provided for antennas #1-#n, respectively, and signal transmission paths to or from the antennas in the transmission and reception operations are switched.

Further, radio base station 3200 includes antenna selecting device 80, which selects the antenna of the highest reception level in accordance with the reception level information in memory 70, i.e., the reception levels of respective antennas related to terminal PS1 in the station's own cell, and switch circuit 90 providing the output of transmission amplifier 50 to one of switch circuits 12.1-12.n corresponding to the antenna, which is selected by the antenna selecting device 80.

Other structures are the same as those of radio base station 3000 of the third embodiment illustrated in FIG. 17. The same portions bear the same reference numbers, and description thereof is not repeated.

Figure 20:
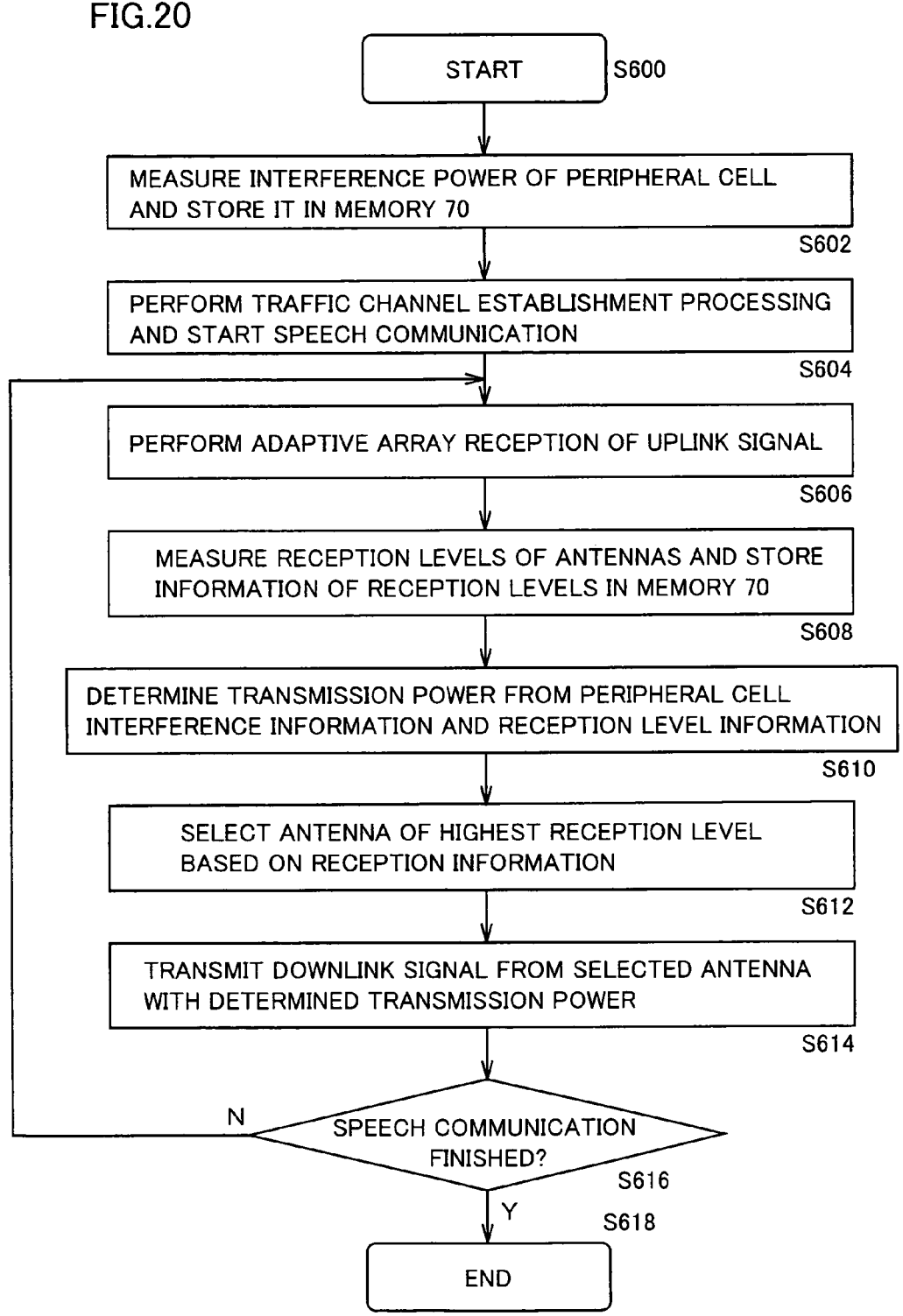
FIG. 20 is a flowchart illustrating an operation of radio base station 3200 of the modification of the third embodiment illustrated in FIG. 19.
Figure 21:
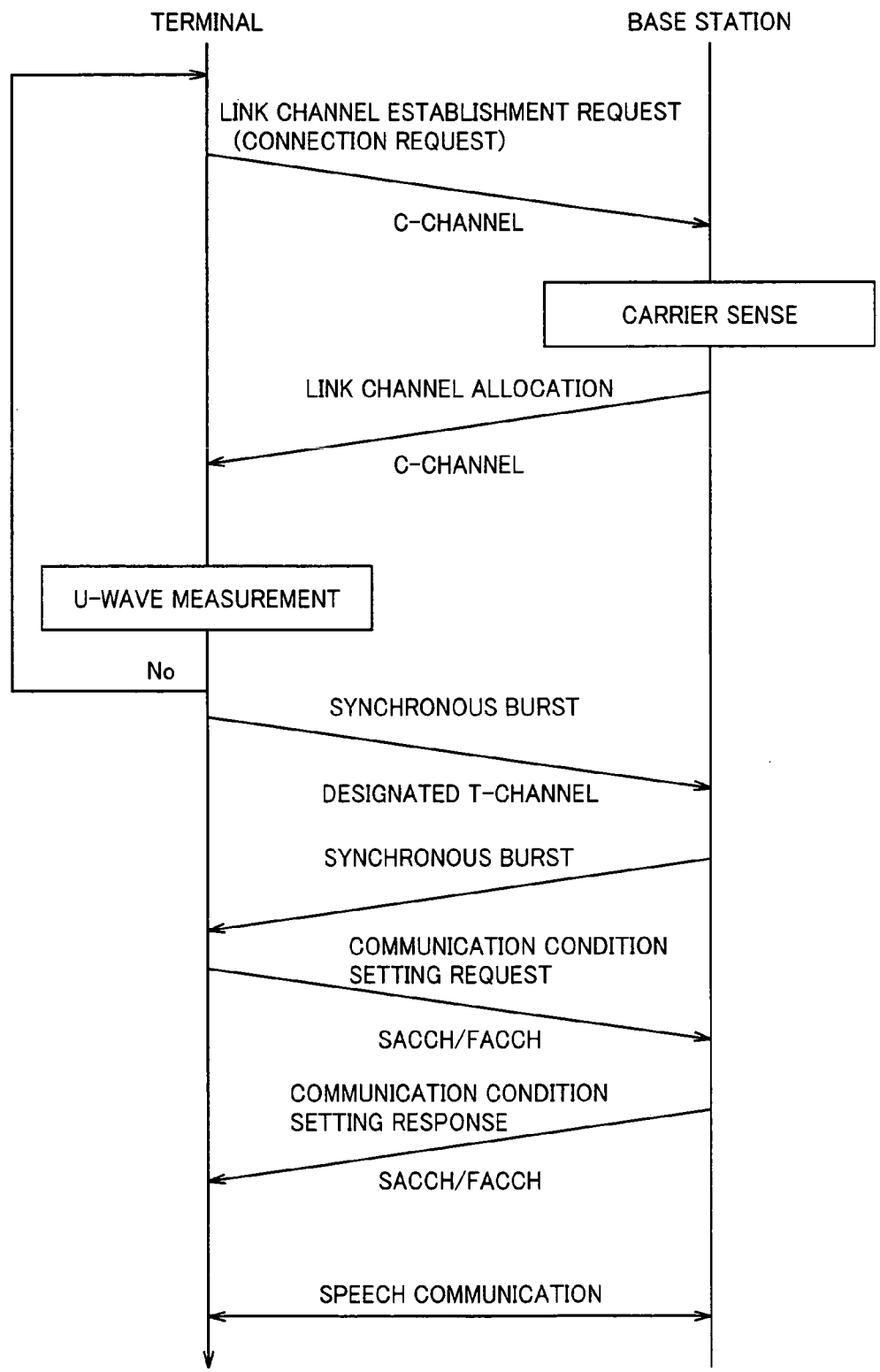
FIG. 21 illustrates a communication sequence flow of a PHS.
Figure 22:
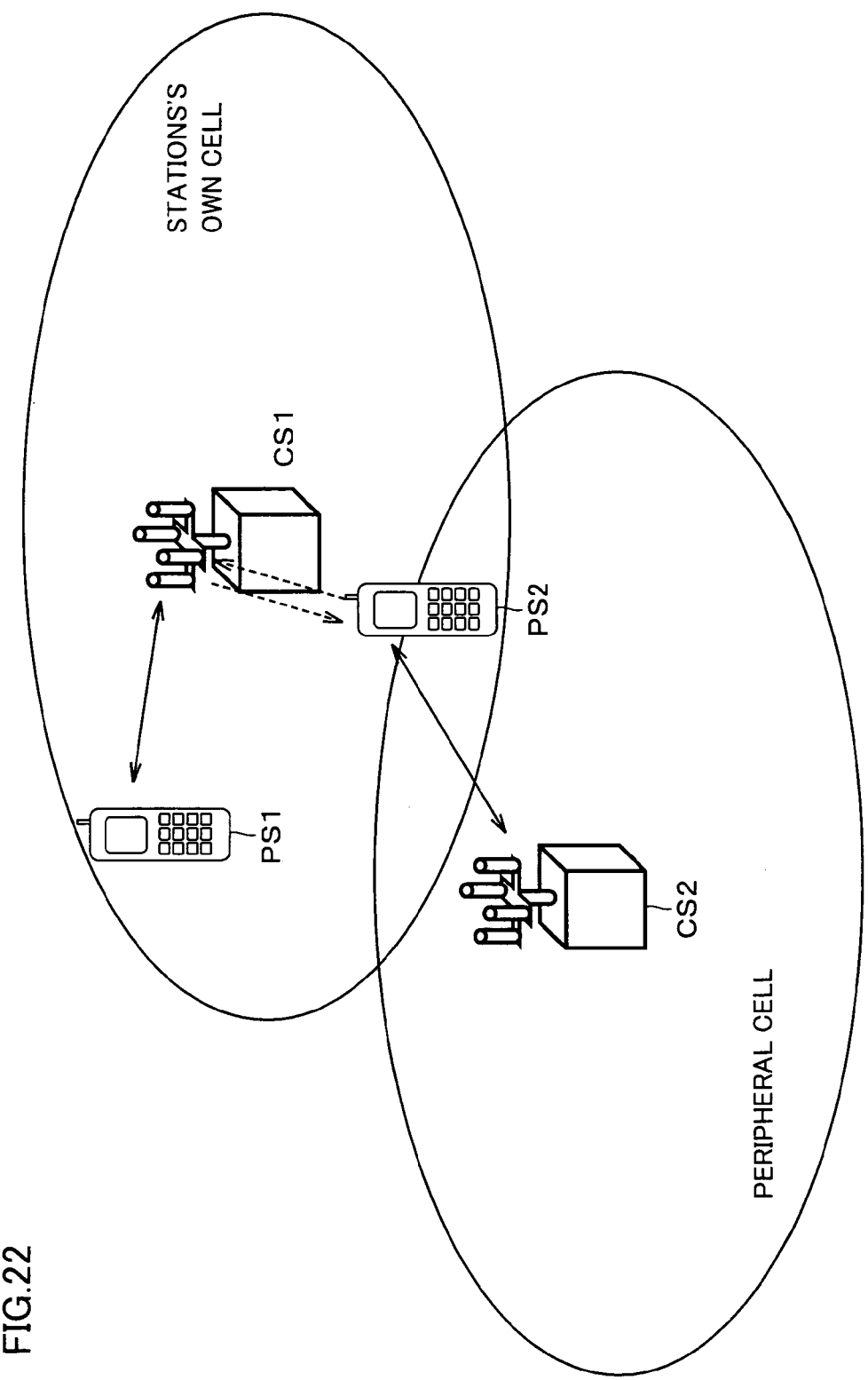
FIG. 22 is a conceptual view illustrating a state of communication between a conventional radio device and a base station.

FIG. 20 is a flowchart illustrating an operation of radio base station 3200 of the third embodiment illustrated in FIG. 19.

Referring to FIG. 20, when the speech communication processing starts (step S600), reception level measuring device 60 measures the interference power applied from the peripheral cell based on the reception signals sent from antennas #1-#n, and stores it in memory 70 (step S602). Subsequently, processing of establishing the traffic channel is performed to start the speech communication (step S604).

Then, the uplink signal is received by performing the adaptive array processing (step S606), and measured reception levels of the respective antennas are stored in memory 70 (step S608).

For transmitting the signal to the user in the station's own cell, the transmission power is determined according to the reception level/transmission power conversion table and based on the information thus stored in memory 70, i.e., based on the information of the interference power applied from the peripheral cell and the information of the reception level obtained from the terminal in the station's own cell (step S610). Antenna selecting device 80 selects the antenna (e.g., antenna #1) of the highest reception level (step S612).

Subsequently, the downlink signal is transmitted from antenna #1 of the highest reception level with the determined transmission power (step S614).

Subsequently, it is determined whether the speech communication is already finished or not (step S616). When the speech communication processing is not finished, the processing returns to step S606.

When it is determined in step S616 that the speech communication is already finished, the speech communication processing ends (step S616).

The structure described above can control the uplink communication and downlink communication as already described with reference to FIGS. 13 to 16. Further, the downlink communication with terminal PS1 in the station's own cell is performed with the antenna of the highest reception level so that the quality of communication in the station's own cell can be kept high.

As described above, the adaptive array reception is performed in the uplink communication with the terminal in the station's own cell so that the reception can be performed while suppressing the interference from the peripheral cell. Also, the non-directional transmission is performed in the downlink communication so that the structure can be simple and inexpensive.

Preferably, according to the invention, the transmission power in the downlink communication is controlled to suppress the influence on the peripheral cell. Therefore, the communication quality of the whole system can be further improved.

INDUSTRIAL APPLICABILITY

Since the adaptive array reception is performed in the uplink communication with the terminal in the station's own cell, the reception can be performed while suppressing the interference from the peripheral cell so that the invention can be effectively applied to the adaptive array radio device.

The invention claimed is:

1. A radio device comprising:
   an array antenna including a plurality of antennas;
   a reception signal processing unit multiplying signals provided from said respective antennas of said array antenna by reception weights, and thereby extracting a signal received from desired another radio device;
   first switch means provided corresponding to at least one of said plurality of antennas for providing the signal received from the corresponding antenna to said reception signal processing unit in a receive operation; and
   a transmission signal processing unit modulating and providing a transmission signal to said first switch means corresponding to the one antenna of said plurality of antennas, wherein
   said first switch means provides the signal received from said transmission signal processing unit to said corresponding antenna in a transmission operation,
   said first switch means are provided corresponding to said plurality of antennas, respectively, said radio device further comprising:
reception level measuring means for measuring reception levels of the signals transmitted from a terminal to be communicated with said radio device and received by said plurality of antennas, respectively;
storage means for storing results of the measurements of said reception level measuring means;
antenna selecting means for selecting the antenna having the maximum reception level from said plurality of antennas based on information stored in said storage means; and
second switch means for providing the signal provided from said transmission signal processing unit to said first switch means corresponding to the selected antenna in accordance with a result of selection by said antenna selecting means.

2. A radio device comprising:
an array antenna including a plurality of antennas;
a reception signal processing unit multiplying signals provided from said respective antennas of said array antenna by reception weights, and thereby extracting a signal received from desired another radio device;
first switch means provided corresponding to at least one of said plurality of antennas for providing the signal received from the corresponding antenna to said reception signal processing unit in a receive operation; and
a transmission signal processing unit modulating and providing a transmission signal to said first switch means corresponding to the one antenna of said plurality of antennas, wherein
said first switch means provides the signal received from said transmission signal processing unit to said corresponding antenna in a transmission operation,
the radio device further comprising:
reception level measuring means for measuring the reception level of the signal received by said plurality of antennas from a desired terminal to be communicated with said radio device;
storage means for storing a result of the measurement by said reception level measuring means and a transmission power level required in accordance with said reception level; and
transmission power calculating means for controlling an output level of said transmission signal processing unit in accordance with the transmission power level determined based on the information stored in said storage means, wherein
said reception level measuring means further measures a level of interference with respect to communication performed with the desired terminal,
said storage means stores the transmission power level required in accordance with said reception level and said interference level, and said interference level, and
said transmission power calculating means determines said transmission power level in accordance with said interference level and said reception level.

3. A radio device comprising:
an array antenna including a plurality of antennas;
a reception signal processing unit multiplying signals provided from said respective antennas of said array antenna by reception weights, and thereby extracting a signal received from desired another radio device;
first switch means provided corresponding to at least one of said plurality of antennas for providing the signal received from the corresponding antenna to said reception signal processing unit in a receive operation; and
a transmission signal processing unit modulating and providing a transmission signal to said first switch means corresponding to the one antenna of said plurality of antennas, wherein
said first switch means provides the signal received from said transmission signal processing unit to said corresponding antenna in a transmission operation,
said first switch means are provided corresponding to said plurality of antennas, respectively,
said radio device further comprising:
reception level measuring means for measuring levels of the signals sent from a terminal to be communicated with said radio device and received by said plurality of antennas;
storage means for storing a result of the measurement of said reception level measuring means and a transmission power level required in accordance with the reception level;
transmission power calculating means for controlling an output level of said transmission signal processing unit in accordance with the transmission power level determined based on the information stored in said storage means;
antenna selecting means selecting the antenna having the maximum reception level from said plurality of antennas based on the information stored in said storage means; and
second switch means providing the signal provided from said transmission signal processing unit to said first switch means corresponding to the selected antenna in accordance with a result of selection of said antenna selecting means.

4. The radio device according to claim 3, wherein
said reception level measuring means further measures a level of interference with respect to communication performed with the desired terminal,
said storage means stores the transmission power level required in accordance with said reception level and said interference level, and said interference level, and
said transmission power calculating means determines said transmission power level in accordance with said interference level and said reception level.

5. A transmission and reception directivity control method of a radio device with an array antenna including a plurality of antennas, comprising the steps of:
multiplying signals provided from said respective antennas of said array antenna by reception weights, and thereby performing separation and extraction of a signal received from desired another radio device;
modulating a transmission signal;
providing said modulated transmission signal to one of said plurality of antennas;
measuring reception levels of signals sent from a desired terminal to be communicated with said radio device and received by said plurality of antennas;
storing said reception levels and transmission power levels required according to the reception levels;
determining the transmission power level based on said reception level and the transmission power level required according to the reception level;
controlling a level of output of said modulated transmission signal according to said determined transmission power level; and
measuring the level of interference with respect to the communication performed with said desired terminal, wherein said step of storing includes the step of:
storing the transmission power level required according to said measured reception level and said interference level, and said interference level, and
said step of determining said transmission power level includes the step of:
determining said transmission power level according to the interference level and the reception level.

6. A transmission and reception directivity control method of a radio device with an array antenna including a plurality of antennas, comprising the steps of:
multiplying signals provided from said respective antennas of said array antenna by reception weights, and thereby performing separation and extraction of a signal received from desired another radio device;
modulating a transmission signal;
providing said modulated transmission signal to one of said plurality of antennas;
measuring levels of signals sent from a desired terminal to be communicated with said radio device and received by said plurality of antennas;
storing said measured reception levels and transmission power levels required according to said reception levels;
determining the transmission power level based on said stored reception level and the transmission power level required according to said reception level;
controlling an output level of said transmission signal according to said determined transmission power level;
selecting the antenna having the maximum reception level from said plurality of antennas based on said measured reception levels;
providing said transmission signal to said selected antenna; and
measuring the level of interference with respect to the communication performed with said desired terminal, wherein
said step of storing includes the step of:
storing the transmission power level required according to said reception level and said interference level, and said interference level, and
said step of determining said transmission power level includes the step of:
determining said transmission power level according to the interference level and the reception level.

7. A computer program product including a computer readable medium storing a transmission and reception directivity control program of a radio device with an array antenna including a plurality of antennas, said program causing a computer to execute the steps of:
multiplying signals provided from said respective antennas of said array antenna by reception weights, and thereby performing separation and extraction of a signal received from desired another radio device;
modulating a transmission signal;
providing said modulated transmission signal to one of said plurality of antennas;
measuring reception levels of signals sent from a desired terminal to be communicated with said radio device and received by said plurality of antennas;
storing said reception levels and transmission power levels required according to the reception levels;
determining the transmission power level based on said reception level and the transmission power level required according to the reception level;
controlling a level of output of said modulated transmission signal according to said determined transmission power level; and
measuring the level of interference with respect to the communication performed with said desired terminal, wherein
said step of storing includes the step of:
storing the transmission power level required according to said measured reception level and said interference level, and said interference level, and
said step of determining said transmission power level includes the step of:
determining said transmission power level according to the interference level and the reception level.

8. A computer program product including a computer readable medium storing a transmission and reception directivity control program of a radio device with an array antenna including a plurality of antennas, said program causing a computer to execute the steps of:
multiplying signals provided from said respective antennas of said array antenna by reception weights, and thereby performing separation and extraction of a signal received from desired another radio device;
modulating a transmission signal;
providing said modulated transmission signal to one of said plurality of antennas;
measuring levels of signals sent from a desired terminal to be communicated with said radio device and received by said plurality of antennas;
storing said measured reception levels and transmission power levels required according to said reception levels;
determining the transmission power level based on said stored reception level and the transmission power level required according to said reception level;
controlling an output level of said transmission signal according to said determined transmission power level;
selecting the antenna having the maximum reception level from said plurality of antennas based on said measured reception levels;
providing said transmission signal to said selected antenna; and
measuring the level of interference with respect to the communication performed with said desired terminal, wherein
said step of storing includes the step of:
storing the transmission power level required according to said reception level and said interference level, and said interference level, and
said step of determining said transmission power level includes the step of:
determining said transmission power level according to the interference level and the reception level.

* * * * *